United States Patent
Haeckel

(10) Patent No.: US 12,460,959 B2
(45) Date of Patent: Nov. 4, 2025

(54) MEASUREMENT SENSOR FOR CORIOLIS FLOW METER

(71) Applicant: Dionex Softron GmbH, Germering (DE)

(72) Inventor: Michael Haeckel, Germering (DE)

(73) Assignee: Dionex Softron GmbH, Germering (DE)

( * ) Notice: Subject to any disclaimer, the term of this patent is extended or adjusted under 35 U.S.C. 154(b) by 272 days.

(21) Appl. No.: 17/929,068

(22) Filed: Sep. 1, 2022

(65) Prior Publication Data

US 2023/0060030 A1 Feb. 23, 2023

(30) Foreign Application Priority Data

Aug. 18, 2021 (DE) ............... 10 2021 121 402.5

(51) Int. Cl.
*G01F 1/74* (2006.01)
*G01F 1/84* (2006.01)

(52) U.S. Cl.
CPC ............ *G01F 1/74* (2013.01); *G01F 1/8431* (2013.01)

(58) Field of Classification Search
CPC ................................ G01F 1/74; G01F 1/8431
(Continued)

(56) References Cited

U.S. PATENT DOCUMENTS 5,384,534 A * 1/1995 Bjork .................... G01P 3/488
324/160
5,892,159 A 4/1999 Smith
(Continued)

FOREIGN PATENT DOCUMENTS

EP 1719983 B1 6/2012
EP 1719982 B1 1/2013

OTHER PUBLICATIONS

Harrison et al. "A simple microfluidic Coriolis effect flowmeter for operation at high pressure and high temperature" Review of Scientific Instruments, 2016, No. 87, 7 pages.
(Continued)

*Primary Examiner* — Peter J Macchiarolo
*Assistant Examiner* — Rodney T Frank

(57) ABSTRACT

The present invention relates to an assembly comprising a source of electromagnetic radiation, a detector assembly comprising a detector for electromagnetic radiation, a tube assembly comprising a portion of a tube, and a source optical element configured to transmit electromagnetic radiation received at a receiving end to an emitting end of the source optical element. The detector assembly comprises a detector assembly receiving end positioned to receive at least a part of the electromagnetic radiation from the source, wherein at least part of the electromagnetic radiation received at the detector assembly receiving end is received by the detector. A first direction (x) is defined by a light path between the emitting end of the source optical element and the detector assembly receiving end, wherein the tube assembly is positioned between the emitting end and the detector assembly receiving end in the first direction (x), wherein the tube assembly is movable to change its position, and wherein an amount of electromagnetic radiation received by the detector depends on the position of the tube assembly. The present invention further relates to a Coriolis flow meter system, a corresponding method and a solvent delivery system.

14 Claims, 3 Drawing Sheets

(58) Field of Classification Search
USPC .................................................. 73/861.356
See application file for complete search history.

(56) References Cited

U.S. PATENT DOCUMENTS

2005/0270899 A1    12/2005  Phallen et al.
2008/0115588 A1*   5/2008   Zwikker ................. G01F 1/844
                                                  73/861.355

OTHER PUBLICATIONS

Examination report mailed on Apr. 4, 2022, to DE Patent Application No. 10 2021 121 402.5.

* cited by examiner

MEASUREMENT SENSOR FOR CORIOLIS FLOW METER

The present invention generally relates to an assembly comprising a source of electromagnetic radiation and a respective detector. Such an assembly may be used in a Coriolis flow meter, and more particularly in an improved motion detection in a Coriolis flow meter. A Coriolis flow meter may also be referred to as Coriolis mass flow meter.

The present invention is described with a particular focus on the measurement of a mass flow rate in liquid chromatography (LC) and more particularly high performance liquid chromatography (HPLC). However, it will be understood that the present technology may also be used in the context of other applications where precise measurements of the mass flow rate is advantageous, e.g. high pressures and volume flow rates in the µl/min to ml/min range.

The principle of chromatography is based on injecting a sample with a sampling unit into a fluidic path, wherein a mobile phase, e.g. comprising liquid solvents, provided by a pump, transports it to and through a chromatographic column comprising a stationary phase, e.g. a solid porous material. The separation of individual constituents of the sample depends on the interactions between the constituents, the stationary phase and the mobile phase. The stronger a constituent interacts with the stationary phase, the longer it may take the mobile phase to elute it from the column. These interactions are characteristic to the constituents and thus result in corresponding characteristic retention times for the constituents, which depend on the specific conditions (e.g. composition of the mobile and stationary phase). Typically, the composition of the mobile phase may be changed over time. Solvent mixing can be performed either before the pump or by combining the flows of two high pressure pumps. Upon passing through the separation column, the constituents may be detected and/or separated for subsequent use.

At present, the flow rate of analytical HPLC systems and thus also the composition of the mobile phase may be controlled solely by the operation of the pump, e.g. by the piston movement. That is, the piston movement may be measured during each pump stroke and the resulting flow rate may be inferred considering the displaced volume in the pumping chamber based on the piston movement. However, this may typically result in very high demands on the tightness of all involved components. Otherwise, the piston movement may not provide a good measure as fluid may leak out and therefore not contribute to the flow rate. This may however result in more complex and elaborate designs of the pumps, as well as higher demands on materials involved.

Furthermore, compressibility and thermal expansion of the fluid require compensation, as they influence the flow rate inferred from the displaced volume. Thermal expansion may not only occur due to changes of the ambient temperature but also due to adiabatic heating during the pumping process. Therefore, inferring the flow rate from the piston displacement may require careful calibration with respect to said fluid characteristics and thus, good knowledge of said fluid characteristics may be required, which can for example be particularly difficult when solvent gradients are used, i.e. when the composition of the mobile phase varies over time.

If, in turn, the flow rate could be measured, deficiencies of the pump could be corrected for and thus accuracy requirements for the pump could be relaxed.

There are mainly three different types of sensors that could be used for flow measurements in HPLC applications: thermal mass flow meters, ultrasonic flow meters and Coriolis mass flow meters. Currently, mainly thermal mass flow meters are used for low-flow HPLC. Each of the different sensor types offers certain advantages and disadvantages. For example, thermal mass flow meters and ultrasonic flow meters may depend on the characteristics of the fluid and thus also require careful calibration. One particular advantage of using a Coriolis mass flow meter is that it provides a linear response to the mass flow through the sensor and that it is independent of the fluid characteristics. Furthermore, it can advantageously also measure the density of the fluid independent of the mass flow measurement. In other words, a Coriolis mass flow meter is linear and solvent independent and can also measure density, which in turn also allows to determine the volume flow rate. Unlike current analytical HPLC pumps which control the volume flow, the retention times can be kept stable independent of the ambient temperature if the mass flow rate is kept constant. In other words, it may be advantageous to measure the mass flow rate instead of the volume flow since this may allow for stable retention times independent of the ambient temperature, i.e. without the need to further take into account and/or control the ambient temperature of the system. Therefore, it may be desirable to have a measurement of the mass flow rate which is inherently provided by a Coriolis mass flow meter.

In a Coriolis mass flow meter, a flow of fluid may generally be forced to move in a non-rectilinear manner through at least one tube, which may comprise a curved or straight tube geometry. The at least one tube is forced to oscillate and due to its rotational flow, the liquid causes a torsion on the at least one tube by means of the Coriolis force. The torsion may be measured by measuring the displacement of the tube in at least two locations, wherein one location may be upstream and the other location may be downstream of the centre of the tube in flow direction. Preferably the two locations are arranged symmetrically around the centre of the tube in flow direction. Thus, the torsion may result in a phase shift between the overall oscillation measured at the two locations. Based on the measured torsion, e.g. the measured phase shift, the mass flow rate can be determined. Furthermore, a change in oscillation frequency may allow to measure the density of the fluid, as the natural frequency of the tube depends on the mass of the tube and the comprised fluid. Thus, it allows for a measurement of the fluid mass and based on the known volume of the tube, the density of the fluid.

That is, in a Coriolis mass flow meter the movement of the tube is measured. This may for example be achieved with an acceleration sensor, a force sensor, electromagnetically, capacitively, interferometrically or by means of conventional optics. For some of these measuring methods additional components may also be attached to the tube. This may be particularly disadvantageous for thin tube, as required for low flow rates, because the vibrating mass may increase significantly. This may for example reduce the accuracy of the mass flow meter.

However, optical measurements may allow for measuring the movement of the measurement tube, without attaching additional components thereto. In particular, it is known from EP 1 719 982 B1 and EP 1 719 983 B1 that the measurement of the tube can be performed by means of forked light barriers.

Forked light barriers may enable measurement of the position of the tube with very high spatial and temporal resolution. Further, such an optical measurement may be done with a very small flag attached directly to the tube to shade the light barrier. Or, depending on the tube, it may advantageously even be possible to forgo using a flag and instead use the tube itself for shading.

One disadvantage, however, is that the photoelectric barrier heats the tube locally. Typically, a light-emitting diode (LED) may be used as a light source in a forked light barrier, for which only about 10% of the electrical energy may be converted into usable light, while the rest may directly be emitted to the environment as heat. While this effect may not be relevant for thick tubes for high flow rates, this effect may amount to a change of several ° C. in a thin tube as may be used for measuring low flow rates used in HPLC applications. However, a change in temperature may lead to a decrease of the Young modulus for most tube materials and thus result in a lower resonance frequency. In addition, a flow of liquid through the tube may cause cooling thereof. Therefore, the resonance frequency, which is used for density measurements, depends on the flow rate. Furthermore, if the flow rate is very low, the flow rate measurement can also disadvantageously be influenced, because the heat transport through the fluid may lead to an asymmetrical temperature distribution. Thus, the resulting inhomogeneous Young modulus may simulate a Coriolis force.

Due to the discussed problems, there may currently be no commercially sensors that can measure a fluid flow in the desired flow rate and pressure range, e.g. suitable for HPLC, with sufficient accuracy.

In light of the above, it is an object to overcome or at least alleviate the shortcomings and disadvantages of the prior art. More particularly, it is an object of the present invention to provide an improved position measurement, e.g. for the oscillating pipe of a Coriolis flow sensor.

These objects are met by the present invention.

In a first embodiment, the present invention relates to an assembly comprising a source of electromagnetic radiation, a detector assembly comprising a detector for electromagnetic radiation, wherein the detector assembly comprises a detector assembly receiving end positioned to receive at least a part of the electromagnetic radiation from the source, wherein at least part of the electromagnetic radiation received at the detector assembly receiving end is received by the detector, and a source optical element configured to transmit electromagnetic radiation received at a receiving end of the source optical element to an emitting end of the source optical element, wherein the receiving end is configured to receive electromagnetic radiation of the source and the emitting end is configured to emit the transmitted electromagnetic radiation. The light path between the emitting end and the detector assembly receiving end defines a first direction and the assembly further comprises a tube assembly comprising a portion of a tube, wherein the tube assembly is positioned between the emitting end and the detector assembly receiving end in the first direction, wherein the tube assembly is movable to change its position, and wherein an amount of electromagnetic radiation received by the detector depends on the position of the tube assembly.

In other words, the assembly according to the present invention comprises a source for electromagnetic radiation, a detector assembly comprising a detector for electromagnetic radiation, a source optical element configured to transmit electromagnetic radiation and a tube assembly comprising a portion of a tube.

These elements are arranged such that electromagnetic radiation, e.g. light, emitted by the source is received by a receiving end of the source optical element, which is configured to transmit the electromagnetic radiation to an emitting end thereof. The emitting end of the source optical element emits the transmitted electromagnetic radiation, i.e. after being transmitted through the source optical element, the transmitted electromagnetic radiation leaves the source optical element at the emitting end. Very generally, not all electromagnetic radiation received at the receiving end may also be transmitted due to losses occurring within the source optical element as well as when coupling into and/or out of the source optical element.

The detector assembly comprises a detector assembly receiving end, which is generally positioned to receive at least part of the electromagnetic radiation from the source. The detector assembly receiving end may for example be a detection area of the detector, e.g. in cases where the detector assembly only comprises a detector. The detector assembly receiving end may thus be arranged such that at least part of the electromagnetic radiation emitted by the source optical element is received by the detector assembly receiving end. Thus, electromagnetic radiation of the source is received at the detector assembly receiving end and a first direction (x) is defined by a light path between the emitting end of the source optical element and the detector assembly receiving end.

Thus, in the absence of any object between the emitting end of the source optical element and the detector assembly receiving end, the detector may receive at least part of the electromagnetic radiation of the source. It will be understood that the term "receive at least a part of the electromagnetic radiation from the source" is not limited do directly receiving electromagnetic radiation from the source, but includes the electromagnetic radiation first passing through further elements, e.g. the source optical element. That is, electromagnetic radiation of the source that is transmitted through the source optical element, subsequently emitted/released at the emitting end of the source optical element and then received by the detector assembly receiving, is electromagnetic radiation from the source that is received by the detector assembly receiving end.

However, the tube assembly is positioned between the emitting end and the detector assembly receiving end in the first direction and my thus block part of the electromagnetic radiation. Said tube assembly is moveable to change its position such that the amount of electromagnetic radiation received by the detector assembly receiving end (and consequently the detector) depends on the position of the tube assembly.

That is, due to the arrangement of the components according to the present invention, the electromagnetic radiation received by the detector may be indicative of the position of the tube assembly. Furthermore, the source optical element may advantageously allow to increase the distance between the source and the tube assembly and/or significantly reduce the amount of heat produced by the source that is reaching the tube assembly and thus prevent unnecessary and undesired heating of the tube assembly.

In some embodiments, the detector assembly may further comprise a detector optical element configured to transmit electromagnetic radiation received at a detector optical element receiving end to a detector optical element emitting end, wherein the detector optical element receiving end may constitute the detector assembly receiving end and may be configured to receive electromagnetic radiation emitted by the emitting end of the source optical element. Further, the detector optical element emitting end may be configured to emit the transmitted electromagnetic radiation and the detector may be configured to receive at least part of the electromagnetic radiation emitted by the detector optical element emitting end.

That is, in some embodiments the detector assembly may comprise a detector optical element which may generally be an optical element similar to the optical element constituting the source optical element. The detector optical element receiving end, i.e. the receiving end of the detector optical element, which may be configured to receive electromagnetic radiation, may constitute the detector assembly receiving end. The detector optical element may be configured to transmit electromagnetic radiation received at its receiving end and subsequently emit transmitted electromagnetic radiation, i.e. the part of the received electromagnetic radiation that has been transmitted through the detector optical element, at its emitting end, which may generally be located such that at least part of the emitted electromagnetic radiation, e.g. light, may be received by the detector. Thus, similar to the source, the detector may be placed at a distance to the tube assembly which may advantageously allow for more flexibility when designing the overall assembly.

The source optical element and/or detector optical element may be a waveguide for electromagnetic radiation. More particular, in some embodiments the source optical element and/or detector optical element may be a light pipe. A light pipe may generally also be referred to as light tube. Alternatively, the source optical element and/or detector optical element may be an optical fibre.

For example, in some embodiments the source optical element may be a light pipe, while the detector optical element may be an optical fibre. In other embodiments both optical elements (i.e. source and detector optical element) may be a light pipe or both optical elements may be an optical fibre. Or, in some embodiments, the assembly merely comprises a source optical element which may for example be an optical fibre or a light pipe or any other type of wave guide.

In some embodiments, the source optical element and/or detector optical element may be a lens, preferably a convex lens. Again, for example one of the source and detector optical element may be a lens, while the other one may be a type of waveguide. Similarly, in some embodiments both optical elements may be a lens, while in some embodiments the assembly comprises only a source optical element, which may for example be a lens.

The source optical element and/or the detector optical element may be configured to transmit at at least one transmission wavelength, wherein at least one of the at least one transmission wavelength is in the range of 200 nm to 5000 nm, preferably in the range of 400 to 2000 nm, more preferably 700 nm to 1000 nm, such as 830 nm, 850 nm, or 940 nm.

In some embodiments, the source optical element and/or the detector optical element may supress the transmission at least for 90%, preferably at least for 95%, more preferably at least for 99% of wavelengths in the range of 2.2 µm to 10 µm, preferably 2 µm to 50 µm, more preferably 2 µm to 100 µm, such as for all wavelengths greater than 2 µm, by at least a factor of 10, preferably at least a factor of 100. That is, the source optical element and/or the detector optical element may attenuate a significant fraction (e.g. at least 90%, at least 95% or at least 99%) of the electromagnetic radiation comprising a wavelength in the range of 2.2 µm to 10 µm, preferably 2 µm to 50 µm, more preferably 2 µm to 100 µm such as for all wavelengths greater than 2 µm, by at least a factor of 10, preferably at least a factor of 100. In some embodiments, the source optical element and/or the detector optical element may suppresses the transmission at least for wavelengths in the range of 2.2 µm to 10 µm, preferably 2 µm to 50 µm, more preferably 2 µm to 100 µm, such as for all wavelengths greater than 2 µm, by at least a factor of 10, preferably by at least a factor of 100. That is, the source optical element and/or the detector optical element may attenuate a significant fraction (e.g. at least 90%, at least 95% or at least 99%) of the electromagnetic radiation comprising a wavelength in the range of 2.2 µm to 10 µm, preferably 2 µm to 50 µm, more preferably 2 µm to 100 µm such as for all wavelengths greater than 2 µm by at least a factor of 10, preferably at least a factor of 100. In other words, the source optical element and/or the detector optical element may be configured to substantially not transmit (e.g. mainly absorb or reflect) electromagnetic radiation at least for wavelengths in in the range of 2.2 µm to 10 µm, preferably 2 µm to 50 µm, more preferably 2 µm to 100 µm, such as for all wavelengths greater than 2 µm. For example, the source optical element and/or the detector optical element may comprise poly(methyl methacrylate), also referred to as PMMA. In some embodiments, the source optical element and/or the detector optical element may supress the transmission at least for wavelengths in the range of 2.2 µm to 10 µm, preferably 2 µm to 50 µm, more preferably 2 µm to 100 µm, such as for all wavelengths greater than 2 µm by at least a factor of 10, preferably by at least a factor of 100. That is, in some embodiments, the source optical element and/or the detector optical element may supress the transmission for 100% of the respective wavelengths. For example, a combination of indium tin oxide with PMMA may comprise such characteristics.

Generally, a material or element may also be referred to as being opaque for certain wavelengths when suppressing the transmission of the respective wavelengths by at least a factor of 100. However, it will be understood, that the absorption, respectively the suppression of transmission may depend on wavelength and material thickness. For example, an "opaque" material may attenuate the light by a factor of 10 per µm material thickness, thus resulting in a factor of $10^{1000}$ for 1 mm material thickness.

However already a factor 10 may provide advantageous effects for the present invention.

The portion of the tube may comprise an inner diameter. That is, the portion of the tube comprised by the tube assembly may comprise an inner diameter. The inner diameter may be in the range of 0.02 mm to 1 mm, preferably 0.1 mm to 0.4 mm, more preferably 0.15 mm to 0.2 mm. Similarly, the portion of the tube may comprise an outer diameter. The outer diameter may in the range of 0.2 mm to 2 mm, preferably 0.3 mm to 0.8 mm, more preferably 0.3 mm to 0.5 mm.

The tube assembly may further comprise a flag, wherein the flag is attached to the portion of the tube. The flag may be configured to block electromagnetic radiation emitted by the source. That is, the flag may be configured to be opaque at least for a part of the spectrum comprising the electromagnetic radiation emitted by the source. Generally, a flag may for example be any kind of sheet, plate and/or cover that can be attached to the portion of the tube to advantageously provide a more defined edge and/or cross-section for varying the amount of electromagnetic radiation received by the detector assembly receiving end and thus the detector when the tube assembly is moving. Again, being "opaque" for a part of the spectrum refers to suppressing the transmission of said part of the spectrum by at least a factor 100.

The source may be a light-emitting diode (LED). For example, the source may be an infrared LED (IR-LED). The infrared LED may be configured to emit electromagnetic radiation at an emission wavelength, wherein the emission wavelength is in the range of 700 nm and 1400 nm, preferably in the range of 800 nm to 1000 nm. That is, the IR-LED may be configured to emit electromagnetic radiation in the near infrared, for example at a wavelength of 810 nm, 830 nm, 850 nm, 875 nm, 880 nm, 885 nm, 890 nm, 940 nm, or 950 nm.

Generally, the source may be configured to provide electromagnetic radiation with a bandwidth that is sufficiently wide not to create interference fringes or sharp diffraction fringes. Generally, source and detector may be chosen such that they fit together, e.g. match or more generally, such that there is significant overlap between the electromagnetic radiation provided by the source and the electromagnetic radiation that can be received and/or detected by the detector.

The source may comprise an emitting power and wherein the emitting power may be in the range of 5 to 500 mW/sr, preferably in the range of 20 to 200 mW/sr, more preferably in the range of 50 to 100 mW/sr.

A minimum distance between the source and the tube assembly may be at least 10 mm, preferably at least 20 mm, more preferably at least 30 mm. That is, the source may be located at least 10 mm away from the tube assembly, wherein the electromagnetic radiation is transmitted to the tube assembly with the aid of the source optical element. Thus, the amount of heat transferred from the source to the tube assembly may advantageously be strongly reduced compared to an assembly wherein the source is closer to the tube assembly and particular wherein no source optical element is present.

The detector may be a photodetector. That is, the detector may generally be a sensor of electromagnetic radiation, which may also be referred to as photosensor.

The detector may comprise a photodiode. Thus, the detector may generally comprise a semiconductor device that converts electromagnetic radiation into an electrical current. The photodiode may be one of a PIN photodiode, a pinned photodiode, or an avalanche photodiode (APD). In some embodiments, the detector may comprise a photodiode array.

The detector may comprise a phototransistor, e.g. a field-effect phototransistor.

The detector may comprise an active-pixel sensor, preferably a CMOS sensor.

The detector may comprise a charge-coupled device (CCD).

In some embodiments, the assembly may further comprise at least one aperture. At least one of the at least one aperture may be located between the emitting end and the tube assembly in the first direction (x). Additionally or alternatively, at least one of the at least one aperture may be located between the tube assembly and the detector assembly receiving end in the first direction (x).

At least one of the at least one aperture may be a diaphragm. That is, the aperture may be a thin opaque structure with an opening at its centre, e.g. an iris diaphragm. Further, at least one of the at least one aperture may be a pinhole and/or at least one of the at least one aperture may be a slit.

In some embodiments, the portion of the tube may be configured to withstand fluid pressures of a fluid being guided through the portion of the tube of at least 50 bar, preferably at least 500 bar, more preferably at least 1000 bar, such as at least 1500 bar.

The portion of the tube may be configured for flow rates of a fluid within the tube at least in the range of 50 µl/min to 5 ml/min, preferably at least in the range of 1 µl/min to 10 ml/min, more preferably at least in the range of 100 nl/min to 10 ml/min.

The portion of the tube may be made of metal or glass. For example, the tube and thus also its portions may be made of metal or glass. The metal may for example be one of steel, titanium, a titanium alloy, zirconium or a Co—Cr—Ni alloy, preferably 316 stainless steel, Ti6Al4V, MP35N® or Hastelloy C276®. The glass may be fused silica.

The detector may be configured to provide detector data indicative of the electromagnetic radiation received by the detector. That is, the detector may for example provide data corresponding to or indicative of the amount of electromagnetic radiation received by the detector. For example, the detector may provide a respective analogue or digital signal.

In another embodiment, the present invention relates to a Coriolis flow meter system, wherein the Coriolis flow meter system comprises a plurality of assemblies as described above. Further, the Coriolis flow meter system comprises a tube, wherein each portion of a tube of the respective tube assembly of the respective assembly is a portion of the tube of the Coriolis flow meter system.

That is, a flow meter system may generally comprise at least two assemblies as described above, which each comprise a respective tube assembly. These tube assemblies each comprise a respective portion of a tube, which is a portion the tube of the Coriolis flow meter system. Thus, each tube assembly comprises a different portion of the same tube.

The Coriolis flow meter system may be configured to determine a mass flow rate of a fluid being guided through the tube. Further, the Coriolis flow meter system may be configured to determine a density of the fluid being guided through the tube. The density of a fluid may very generally depend on the pressure and the temperature.

The Coriolis flow meter may be configured to determine a volume flow rate of the fluid being guided through the tube. In some embodiments, the Coriolis flow meter may be configured to determine the volume flow rate of the fluid based on the density and the mass flow rate. That is, the volume flow rate may be determined based on a measured mass flow rate and a measured density. For example, the density may be measured once at ambient pressure and temperature, and the obtained value may be utilized throughout following flow measurements to convert a measured mass flow into a volume flow. Alternatively, the density may for example be measured in regular intervals or even for each measurement of the mass flow rate.

The Coriolis flow meter system may be configured to determine the volume flow rate of the fluid at least over the complete range of 50 µl/min to 5 ml/min, preferably over the complete range of 1 µl/min to 10 ml/min, more preferably over the complete range of 100 nl/min to 10 ml/min. Additionally or alternatively, the Coriolis flow meter system may be configured to determine the volume flow rate of the fluid over the range of 1 µl/min to 5 ml/min with an accuracy of at least 1%, preferably at least 0.1%, more preferably at least 0.01%, or at least 10 nl/min, whichever corresponds to a higher absolute flow rate. That is, the flow rate may be determined with a relative accuracy of at least 1%, preferably at least 0.1%, more preferably at least 0.01%, at least so long as respective absolute flow rate value for the accuracy is greater than 10 nl/min. Thus the Coriolis flow meter system may advantageously be configured to determine the volume flow rate over a wide range of different flow rates and/or at a high accuracy, particularly to state-of-the-art flow sensors in HPLC systems Similarly, the Coriolis flow meter system may be configured to determine the mass flow rate of the fluid at least over the complete range of 1 mg/min to 5 g/min, preferably over the complete range of 1 mg/min to 10 g/min, more preferably over the complete range of 100 µg/min to 10 g/min. Additionally or alternatively, the Coriolis flow meter system may be configured to determine the mass flow rate of the fluid over the range of 50 mg/min to 5 g/min with an accuracy of at least 1%, preferably at least 0.1%, more preferably at least 0.01%, or at least 10 µg/min, whichever corresponds to a higher absolute flow rate value. Again, this is to be understood as the flow rate may be determined with a relative accuracy of at least 1%, preferably at least 0.1%, more preferably at least 0.01%, at least so long as the respective absolute flow rate value for the accuracy is greater than 10 µg/min.

In general, it will be understood that the measurement range of the Coriolis flow meter system may reach as far as 0 or even small negative flows.

The Coriolis flow meter system may comprise at least one actuator configured to induce a movement of the tube. The actuator may be configured to induce an oscillation of the tube. Further, the actuator may comprise an actuation frequency and said actuation frequency may be in the range of 1 Hz to 5 kHz, preferably 10 Hz to 1 kHz.

The at least one actuator may comprise at least one of an electromagnetic coil and/or a piezo crystal. That is, the at least one actuator may for example comprise an electromagnetic coil to induce movement and preferably oscillations of the tube utilizing electromagnetic forces. An alternating electromagnetic field may be provided by passing an alternating current (AC) through the electromagnetic coil. Alternatively, the at least one actuator may comprise a piezo crystal, i.e. a piezoelectric crystal, which may deform under stress due to an applied electrical field owing to the reverse piezoelectric effect. A periodic deformation of the piezo crystal may thus for example be provided by applying an alternating electric filed. Such a periodic deformation may be used to induce movement and preferably oscillation of the tube.

The Coriolis flow meter system may be configured to provide mass flow data indicative of the determined mass flow rate. Additionally or alternatively, the Coriolis flow meter system may be configured to provide density data indicative of the determined density and/or volume flow data indicative of the determined volume flow rate. In other words, the Coriolis flow meter system may provide respective data indicative of the determined mass flow rate, volume flow rate and/or density. Such data may be digital or analogue. For example, a digital or analogue signal indicative of the determined values may be provided by the Coriolis flow meter system. Thus, other devices and components may advantageously access said data and thus the information on the flow rates and/or density of the fluids determined by the Coriolis flow meter system.

The Coriolis flow meter system may comprise a data processing unit. A data processing unit may for example comprise a central processing unit (CPU), a graphics processing unit (GPU) and/or a microprocessor. That is, the data processing unit may generally be configured to process data, preferably digital data. The data processing unit may comprise a digital signal processor.

In some embodiments, the data processing unit may be configured to determine the mass flow rate based on the detector data of the plurality of assemblies. Additionally or alternatively, the data processing unit may be configured to determine the density based on the detector data of the plurality of assemblies.

Furthermore, the data processing unit may in some embodiments be configured to determine the volume flow rate based on the detector data of the plurality of assemblies. For example, the data processing unit may be configured to determine the volume flow rate based on the mass flow rate and the density.

The Coriolis flow meter system may be configured to determine the location of the respective tube assembly of each of the plurality of assemblies. That is, the Coriolis flow meter system may generally be configured to determine the relative position of the tube assembly compared to a reference position, e.g. a position wherein the tube assembly is unperturbed and not in motion. For example, a movement of the tube assembly may alter the amount of electromagnetic radiation of the source being received by the detector. That is, the tube assembly may move within the light path between the emitting end of the source optical element and the detector assembly receiving end and therefore block some (or none, or all) of the electromagnetic radiation from reaching the detector assembly receiving end. Thus, the amount of electromagnetic radiation reaching the detector may be indicative of the location of the tube assembly and therefore allow to determine its location.

The Coriolis flow meter system may be configured to determine the oscillation phase and/or frequency of the respective tube assembly of each of the plurality of assemblies. For example, based on the position measurements of the tube assembly at different times the oscillation frequency and/or phase of the tube assembly may be determined.

The data processing unit may be configured to determine the oscillation phase and/or frequency of the respective tube assembly of each of the plurality of assemblies based on the detector data of the plurality of assemblies.

The data processing unit may be configured to determine the respective location of the tube assembly of each of the assemblies in a direction perpendicular to the first direction (x) based on the detector data of the plurality of assemblies. It will be understood, that for each of the plurality of assemblies comprised by the system, the respected first direction (x) may be oriented in different directions with respect to each other, based on the relative orientation within the system.

Further, the data processing unit may be configured to control the at least one actuator.

In another embodiment, the present invention relates to a solvent delivery system configured to provide a mixture of at least two solvents, the solvent delivery system comprising at least two pump units, a mixer, and at least two Coriolis flow meter systems as described above.

A pump unit may for example refer to a separate pump or to a separate pump channel of a pump, e.g. a pump comprising two pump heads, wherein each pump head provides a separate flow of fluid. Very generally, a pump unit may comprise one or a plurality of pistons, e.g. dual-piston pump. The mixer may be designed to provide longitudinal and/or transverse mixing of fluids provided to the mixer.

Each pump unit may comprise an input and an output, wherein the input of each pump unit is configured to be fluidly connected to at least one solvent reservoir, respectively, and wherein the output of each pump unit is fluidly connected to the mixer, respectively. Thus, each pump unit may be configured to draw a solvent at the input and provide the pressurized solvent at the output from where it may be guided to a mixer, e.g. to mix with solvents provided by other pump units. Generally, the solvent delivery system may for example be a binary pump for LC, HPLC and/or UHPLC.

Further, each of the at least two Coriolis flow meter systems may be fluidly connected to a different pump unit. For example, if the solvent delivery system comprises two pump units and two Coriolis flow meter systems, each of those Coriolis flow meter systems may be connected to a different one of the two pump units. Thus, in such an embodiment the Coriolis flow meter systems may allow to individually determine the flow provided by each pump unit. Preferably, each of the at least two Coriolis flow meter systems may be located downstream of a respective pump unit and upstream of the mixer, respectively. In other words, the Coriolis flow meter system may be located between the pump unit and the mixer. Thus, a solvent flow provided at the output of a pump unit may first be guided through the Coriolis flow meter system, where the flow provided by the pump may be measured, and then to the mixer.

The solvent delivery system may be configured to control the pump units based on flow rates measured by the respective Coriolis flow meter systems. For example, the flow measured with the Coriolis flow meter system may be utilised to provide a feedback to the pump unit and to adjust the pump unit to provide the desired flow, e.g. by adjusting the piston speed, its frequency and/or volume displaced by the piston in one stroke. Thus, data provided by the Coriolis flow meter system may be utilized as an error signal in a feedback loop to the pump, e.g. by means of a PID controller. Further, the solvent delivery system may be configured to provide the mixture of at least two solvents at a desired ratio by controlling the pump units based on the flow rates measured by the respective Coriolis flow meter systems. In other words, the Coriolis flow meter system may advantageously allow to control the mixing ratio of the solvent based on the flow rates of the respective solvents provided to the mixer The solvent delivery system may be a high-pressure gradient pump.

The solvent delivery system may be configured to provide volume flow rates in the range of 50 µl/min to 2 ml/min, preferably in the range of 50 µl/min to 10 ml/min.

The solvent delivery system may be configured to provide a solvent mixture with an accuracy of at least 1%, preferably at least 0.1%, more preferably at least 0.01% for solvent mixtures comprising at least 1% of each contributing solvent. That is for example for a solvent mixture of solvent A and B, wherein the solvent mixture comprises at least 1% of each of solvent A and B.

The solvent delivery system may be configured for operating pressures exceeding 250 bar, preferably exceeding 500 bar, more preferably exceeding 1000 bar.

In some embodiments, the solvent delivery system may further comprise a controller. The controller may be operatively connected to the at least two pumping units and to the at least two Coriolis flow meter systems. Further, the controller may be configured to control the flow rate provided by each pump unit based on data provided by the respective Coriolis flow meter system. That is, the controller may control the pump units based on the data provided by the respective Coriolis flow meter systems such that a desired flow rate is provided, wherein the flow rate may be a mass or volume flow rate.

The data provided by the at least two Coriolis flow meter systems may comprise detector data. The controller may further be configured to determine the location of the tube assembly based on the detector data. For example, the controller may determine the location (or position) of the tube assembly relative to a fixed reference point, e.g. the location/position of the tube assembly when no fluid is flowing through the tube assembly and/or no movement is induced by an actuator.

The controller may be configured to determine the mass flow rate, the density and/or the volume flow rate of the fluid at the output of each pump unit based on the data provided by the respective Coriolis flow meter system.

In some embodiments, the data provided by the Coriolis flow meter systems may comprise one or more of mass flow data, density data and/or volume flow data.

The controller may comprise at least one data processing unit. In some embodiments, the data processing unit may comprise a digital signal processor.

The controller may be configured to control the solvent delivery system.

The solvent delivery system may further comprise at least two solvent reservoirs.

In a further embodiment the present invention relates to a chromatography system, wherein the chromatography system comprises at least one assembly, at least one Coriolis flow meter system, or at least one solvent delivery system as described above. The chromatography system may be a liquid chromatography system and preferably a high performance liquid chromatography system.

The chromatography system may comprise the at least one solvent delivery system as described above. It will be understood that in such an embodiment, the at least one assembly or the at least one Coriolis flow meter system comprised by the chromatography system is further comprised by the solvent delivery system as described above. That is, the chromatography system may comprise a solvent delivery system, which in turn comprises at least two Coriolis flow meter systems comprising assemblies as described above.

Alternatively, the system may comprise at least one pump. The at least one pump may be configured to provide volume flow rates at least in the range of 50 µl/min to 2 ml/min, preferably in the range of 1 µl/min to 10 ml/min. Additionally or alternatively, the at least one pump may comprise an operating pressure range of at least 50 bar to 250 bar, preferably at least of 25 bar to 500 bar, more preferably at least 20 bar to 1500 bar.

Each of the at least one assembly or each of the at least one Coriolis flow meter system may be located downstream of one of the at least one pump, respectively. In other words, each of the at least one pump may be located upstream of one of the at least one assembly or one of the at least one Coriolis flow meter system. Thus, each of the at least one assembly or the at least one Coriolis flow meter system may be fluidly connected on of the at least one pump, respectively, and further be located downstream thereof.

Each of the at least one assembly or each of the at least one Coriolis flow meter system may be located directly downstream of one of the at least one pump, respectively. That is, the at least one assembly or the at least one Coriolis flow meter system may each be located downstream of one of the at least one pump such that only respective fluid connections are located between the respective pump and assembly or Coriolis flow meter system. In particular, there may be no other system components than a fluid connection, e.g. a tube, between the respective pump and assembly or Coriolis flow meter system.

The chromatography system may further comprise at least one separation column. The at least one assembly or the at least one Coriolis flow meter system may be located upstream of the at least one separation column.

In embodiments comprising at least one a solvent delivery system, the at least one separation column may be downstream of at least one the solvent delivery system. Similarly, in embodiments comprising at least one pump, the at least one separation column may be located downstream of the at least one pump.

The chromatography system may further comprise at least one sampling device. The at least one assembly or the at least one Coriolis flow meter system may be located upstream of the at least one sampling device.

In Embodiments comprising a solvent delivery system, the at least one sampling device may be located downstream of the at least one solvent delivery system. Similarly, in embodiments comprising at least one pump the at least one sampling device may be located downstream of the at least one pump.

The at least one sampling device may be located upstream of the at least one separation column.

The chromatography system may further comprise at least one distribution valve comprising multiple ports and configured to selectively connect ports. The at least one assembly or the at least one Coriolis flow meter system may be located upstream of the at least one distribution valve. Each of the at least one sampling device may be fluidly connected to a port of one of the at least one distribution valve. The at least one distribution valve may be located upstream of the at least one separation column.

The chromatography system may further comprise at least one trap column. The at least one assembly or the at least one Coriolis flow meter system may be located upstream of the at least one trap column. The at least one trap column may be located upstream of the at least one separation column.

The chromatography system may further comprise at least one sample loop. The at least one assembly or the at least one Coriolis flow meter system may be located upstream of the at least one sample loop. The at least one sample loop may be located upstream of the at least one separation column.

The chromatography system may further comprise at least one chromatography detector. The at least one assembly or the at least one Coriolis flow meter system may be located upstream of the at least one chromatography detector. The at least one chromatography detector may be located downstream of at least one of the at least one separation column.

A chromatography detector may for example be one of a charged aerosol detector (CAD), an evaporative light scattering detector, a mass spectrometer (MS), refractive-index detector, multi-angle light scattering detector, or a fluorescence detector.

The chromatography system may further comprise a system controller. The system controller may be operatively connected to the at least one pump and to the at least one assembly or the at least one Coriolis flow meter system.

The system controller may be configured to control the volume flow rate provided by the at least one pump based on data provided by the at least one assembly or the at least one Coriolis flow meter system. The data provided by the at least one assembly or the at least one Coriolis flow meter system may comprise detector data.

The system controller may be configured to determine the location of the tube assembly based on the detector data. Further, the system controller may be configured to determine the mass flow rate, the density and/or the volume flow rate based on the data provided by the at least one assembly or the at least one Coriolis flow meter system.

In an embodiment comprising at least one Coriolis flow meter system, the data provided by the at least one Coriolis flow meter system may comprise at least one of mass flow data, density data and/or volume flow data.

The system controller may comprise at least one data processing unit.

The system controller may be configured to control the chromatography system.

The chromatography system may be configured to operate at pressures of at least up to 50 bar, preferably at least up to 250 bar, more preferably at least up to 500 bar, such as at least up to 1000 bar or 1500 bar.

In yet another embodiment, the present invention relates to a method, wherein the method uses the Coriolis flow meter system as described above, wherein the method comprises guiding electromagnetic radiation emitted by the source through the source optical element and in the direction of the detector assembly for each assembly comprised by the Coriolis flow meter system, respectively.

That is, the method comprises for each of the assemblies comprised by the Coriolis flow meter system, guiding electromagnetic radiation of the source through the source optical element in the direction of the detector assembly. Thus, according to the method, electromagnetic radiation of the source is received by the receiving end of the source optical element, transmitted through the source optical element and emitted at the emitting end of the source optical element in the direction of the detector assembly and more specifically in the direction of the detector assembly receiving end.

The method may comprise causing a fluid to flow through the tube. That is, a fluid flow may be caused through the tube of the Coriolis flow meter system, e.g. by means of a pump or pump unit.

The method may further comprise in a first flow step, causing a fluid to flow through the tube with a flow rate in the range of 50 μl/min to 500 μl/min, preferably 50 μl/min to 150 μl/min, and in a second flow step, causing a fluid to flow through the tube with a flow rate in the range of 1 ml/min to 5 ml/min, preferably 2 ml/min to 5 ml/min. Thus, the method may comprise causing a fluid flow through the tube at significantly different flow rates, e.g. low and high flow rates. The fluid may be at a pressure exceeding 10 bar, preferably exceeding 100 bar, m or preferably exceeding 500 bar, such as exceeding 1000 bar.

The method may further comprise inducing an oscillation of the tube at an actuation frequency. For example, an actuator comprising a coil or a piezoelectric crystal may be utilised to induce an oscillatory movement of the tube. The actuation frequency may be in the range of 1 Hz to 5 kHz, preferably 10 Hz to 1 kHz.

The method may comprise detecting the amount of electromagnetic radiation reaching the respective detector of the plurality of assemblies and generating corresponding detector data. Thus, the generated detector data may be indicative of the amount of electromagnetic radiation reaching the respective detector. The method may further comprise determining a flow rate based on the detector data. For example, by measuring the amount of electromagnetic radiation reaching the respective detectors and by comparing the detector data of different detectors of the Coriolis flow meter system, a flow rate may be determined.

The step of determining the flow rate may comprise determining at least one of a mass flow rate and a volume flow rate. Further, the step of determining the flow rate may further comprise determining a density of the fluid based on the detector data.

Additionally or alternatively, the step of determining the flow rate may comprise determining a respective location of the tube assembly of each of the plurality of assemblies at least with respect to a direction perpendicular to the first direction (x) based on the detector data. It will be understood that for each of the plurality of assemblies comprised by the system, the respected first direction (x) may be oriented in different directions with respect to each other, based on the relative orientation within the system.

The step of determining the flow rate may further comprise determining a respective oscillation frequency and/or phase of the tube assembly of each of the plurality of assemblies based on the detector data. Furthermore, the step of determining the flow rate may comprise comparing the phase of the oscillation of the respective tube assemblies. By comparing the phase of the oscillation of the respective tube assemblies, i.e. the phase of the oscillation at different positions along the tube, the flow rate may be determined. Such a flow rate determination may be based on the Coriolis force.

Determining the density of the fluid may comprise determining the resonance frequency of the tube assembly. That is, the resonance frequency of the tube assembly may depend on the overall mass of the tube assembly and the fluid and since the internal fluid volume of the tube is fixed, it may thus allow to determine the fluid's density The Coriolis flow meter system as described above may be configured to perform the method as described above. The data processing unit of the Coriolis flow meter system may be configured to perform and/or control any of the method steps describes above.

In another embodiment the present invention relates to a use of the assembly (as described above) or the Coriolis flow meter system (as described above) to determine the mass and/or volume flow rate of a fluid being guided through the tube.

The use may be in chromatography. The use may be in liquid chromatography. Further, the use may be in high performance liquid chromatography. Yet further, the use may be in ultra-high performance liquid chromatography.

Below, reference will be made to assembly embodiments. These embodiments are abbreviated by the letter "A" followed by a number. Whenever reference is herein made to "assembly embodiments", these embodiments are meant.

A1. An assembly comprising
a source (1) of electromagnetic radiation;
a detector assembly (2) comprising a detector (21) for electromagnetic radiation,
wherein the detector assembly (2) comprises a detector assembly receiving end (22) positioned to receive at least a part of the electromagnetic radiation from the source (1),
wherein at least part of the electromagnetic radiation received at the detector assembly receiving end (22) is received by the detector (21);
a source optical element (5) configured to transmit electromagnetic radiation received at a receiving end (51) of the source optical element (5) to an emitting end (52) of the source optical element (5),
wherein the receiving end (51) is configured to receive electromagnetic radiation of the source (1),
wherein the emitting end (52) is configured to emit the transmitted electromagnetic radiation, and
wherein a first direction (x) is defined by a light path between the emitting end (52) and the detector assembly receiving end (22);
a tube assembly (4) comprising a portion of a tube, wherein the tube assembly (4) is positioned between the emitting end (52) and the detector assembly receiving end (22) in the first direction (x),
wherein the tube assembly (4) is movable to change its position, and wherein an amount of electromagnetic radiation received by the detector (2) depends on the position of the tube assembly (4).

A2. The assembly according to the preceding assembly embodiment, wherein the detector assembly further comprises a detector optical element configured to transmit electromagnetic radiation received at a detector optical element receiving end (231) to a detector optical element emitting end (232),
wherein the detector optical element receiving end (231) constitutes the detector assembly receiving end (22) and is configured to receive electromagnetic radiation emitted by the emitting end (52) of the source optical element (5),
wherein the detector optical element emitting end (232) is configured to emit the transmitted electromagnetic radiation, and
wherein the detector (21) is configured to receive at least part of the electromagnetic radiation emitted by the detector optical element emitting end (232).

A3. The assembly according to any of the preceding assembly embodiments, wherein the source optical element and/or detector optical element is a waveguide for electromagnetic radiation.

A4. The assembly according to any of the embodiments, wherein the source optical element and/or detector optical element is a light pipe.

A light pipe may also be referred to as light tube.

A5. The assembly according to any of the preceding assembly embodiments, wherein the source optical element and/or detector optical element is an optical fibre.

A6. The assembly according to any of the embodiments A1 or A2, wherein the source optical element and/or detector optical element is a lens, preferably a convex lens.

A7. The assembly according to any of the preceding assembly embodiments, wherein the source optical element and/or the detector optical element is configured to transmit at at least one transmission wavelength, wherein at least one of the at least one transmission wavelength is in the range of 200 nm to 5000 nm, preferably in the range of 400 to 2000 nm, more preferably 700 nm to 1000 nm, such as 830 nm, 850 nm, or 940 nm.

A8. The assembly according to any of the preceding assembly embodiments, wherein the source optical element and/or the detector optical element suppresses the transmission at least for 90%, preferably 95% more preferably 99% of wavelengths in the range of 2.2 µm to 10 µm, preferably 2 µm to 50 µm, more preferably 2 µm to 100 µm, such as for all wavelengths greater than 2 µm, by at least a factor of 10, preferably by at least a factor of 100.

A9. The assembly according to any of the preceding assembly embodiments, wherein the source optical element and/or the detector optical element suppresses the transmission at least for wavelengths in the range of 2.2 µm to 10 µm, preferably 2 µm to 50 µm, more preferably 2 µm to 100 µm, such as for all wavelengths greater than 2 µm, by at least a factor of 10, preferably by at least a factor of 100.

A10. The assembly according to any of the preceding assembly embodiments, wherein the portion of the tube comprises an inner diameter.

A11. The assembly according to the preceding assembly embodiment, wherein the inner diameter is in the range of 0.02 mm to 1 mm, preferably 0.1 mm to 0.4 mm, more preferably 0.15 mm to 0.2 mm.

A12. The assembly according to any of the preceding assembly embodiments, wherein the portion of the tube comprises an outer diameter.

A13. The assembly according to the preceding assembly embodiment, wherein the outer diameter is in the range of 0.2 mm to 2 mm, preferably 0.3 mm to 0.8 mm, more preferably 0.3 mm to 0.5 mm.

A14. The assembly according to any of the preceding assembly embodiments, wherein the tube assembly further comprises a flag, wherein the flag is attached to the portion of the tube.

A15. The assembly according to the preceding assembly embodiment, wherein the flag is configured to block electromagnetic radiation emitted by the source.

A16. The assembly according to any of the preceding assembly embodiments, wherein the source is a light-emitting diode (LED).

A17. The assembly according to the preceding assembly embodiment, wherein the source is an infrared LED (IR-LED).

A18. The assembly according to the preceding assembly embodiment wherein the infrared LED is configured to emit electromagnetic radiation at an emission wavelength, wherein the emission wavelength is in the range of 700 nm and 1400 nm, preferably in the range of 800 nm to 1000 nm.

A19. The assembly according to any of the preceding assembly embodiments, wherein the source comprises an emitting power and wherein the emitting power is in the range of 5 to 500 mW/sr, preferably in the range of 20 to 200 mW/sr, more preferably in the range of 50 to 100 mW/sr.

A20. The assembly according to any of the preceding assembly embodiments, wherein a minimum distance between the source and the tube assembly is at least 10 mm, preferably at least 20 mm, more preferably at least 30 mm.

A21. The assembly according to any of the preceding assembly embodiments, wherein the detector is a photodetector.

A22. The assembly according to any of the preceding assembly embodiments, wherein the detector comprises a photodiode.

A23. The assembly according to the preceding assembly embodiment, wherein the photodiode is a PIN photodiode.

A24. The assembly according to the penultimate assembly embodiment, wherein the photodiode is a pinned photodiode.

A25. The assembly according any of the preceding assembly embodiments with the features of embodiment A20, wherein the photodiode is an avalanche photodiode (APD).

A26. The assembly according to any of the preceding assembly embodiments, wherein the detector comprises a photodiode array.

A27. The assembly according to any of the preceding assembly embodiments, wherein the detector comprises a phototransistor.

A28. The assembly according to any of the preceding assembly embodiments, wherein the detector comprises an active-pixel sensor, preferably a CMOS sensor.

A29. The assembly according to any of the preceding assembly embodiments, wherein the detector comprises a charge-coupled device (CCD).

A30. The assembly according to any of the preceding assembly embodiments, wherein the assembly further comprises at least one aperture.

A31. The assembly according to the preceding assembly embodiment, wherein at least one of the at least one aperture is located between the emitting end and the tube assembly in the first direction (x).

A32. The assembly according to any of the 2 preceding assembly embodiments, wherein at least one of the at least one aperture is located between the tube assembly and the detector assembly receiving end in the first direction (x).

A33. The assembly according to any of the 3 preceding assembly embodiments, wherein at least one of the at least one aperture is a diaphragm.

A34. The assembly according to any of the 4 preceding assembly embodiments, wherein at least one of the at least one aperture is a pinhole.

A35. The assembly according to any of the 5 preceding assembly embodiments, wherein at least one of the at least one aperture is a slit.

A36. The assembly according to any of the preceding assembly embodiments, wherein the portion of the tube is configured to withstand fluid pressures of a fluid being guided through the portion of the tube of at least 50 bar, preferably at least 500 bar, more preferably at least 1000 bar, such as at least 1500 bar.

A37. The assembly according to any of the preceding assembly embodiments, wherein the portion of the tube is configured for flow rates of a fluid within the tube at least in the range of 50 µl/min to 5 ml/min, preferably at least in the range of 1 µl/min to 10 ml/min, more preferably at least in the range of 100 nl/min to 10 ml/min.

A38. The assembly according to any of the preceding assembly embodiments, wherein the portion of the tube is made of metal or glass.

A39. The assembly according to the preceding assembly embodiment, wherein the metal is one of steel, titanium, a titanium alloy, zirconium or a Co—Cr—Ni alloy, preferably 316 stainless steel, Ti6Al4V, MP35N® or Hastelloy C276®.

A40. The assembly according to any of the 2 preceding assembly embodiments, wherein the glass is fused silica.

A41. The assembly according to any of the preceding assembly embodiments, wherein the detector is configured to provide detector data indicative of the electromagnetic radiation received by the detector.

Below, reference will be made to Coriolis flow meter system embodiments. These embodiments are abbreviated by the letter "S" followed by a number. Whenever reference is herein made to "system embodiments", these embodiments are meant.

S1. A Coriolis flow meter system,
wherein the Coriolis flow meter system comprises a plurality of assemblies according to any of the preceding assembly embodiments,
wherein the Coriolis flow meter system comprises a tube, and
wherein each portion of a tube of the respective tube assembly (4) of the respective assembly is a portion of the tube of the Coriolis flow meter system.

S2. The Coriolis flow meter system according to the preceding system embodiment, wherein the Coriolis flow meter system is configured to determine a mass flow rate of a fluid being guided through the tube.

S3. The Coriolis flow meter system according to any of the preceding system embodiments, wherein the Coriolis flow meter system is configured to determine a density of the fluid being guided through the tube.

S4. The Coriolis flow meter system according to any of the preceding system embodiments, wherein the Coriolis flow meter is configured to determine a volume flow rate of the fluid being guided through the tube.

S5. The Coriolis flow meter system according to the preceding system embodiment and with the features of S2 and S3, wherein the Coriolis flow meter is configured to determine the volume flow rate of the fluid based on the density and the mass flow rate.

S6. The Coriolis flow meter system according to any of the 2 preceding system embodiments, wherein the Coriolis flow meter system is configured to determine the volume flow rate of the fluid at least over the complete range of 50 µl/min to 5 ml/min, preferably over the complete range of 1 µl/min to 10 ml/min, more preferably over the complete range of 100 nl/min to 10 ml/min.

S7. The Coriolis flow meter system according to any of the 3 preceding system embodiments, wherein the Coriolis flow meter system is configured to determine the volume flow rate of the fluid over the range of 1 µl/min to 5 ml/min with an accuracy of at least 1%, preferably at least 0.1%, more preferably at least 0.01%, or at least 10 nl/min, whichever corresponds to a higher absolute flow rate value.

S8. The Coriolis flow meter system according to any of the preceding the system embodiments and with the features of embodiment S2, wherein the Coriolis flow meter system is configured to determine the mass flow rate of the fluid at least over the complete range of 50 mg/min to 5 g/min, preferably over the complete range of 1 mg/min to 10 g/min, more preferable over the complete range of 100 µg/min to 10 g/min.

S9. The Coriolis flow meter system according to any of the preceding system embodiments and with the features of S2, wherein the Coriolis flow meter system is configured to determine the mass flow rate of the fluid over the range of 1 mg/min to 5 g/min with an accuracy of at least 1%, preferably at least 0.1%, more preferably at least 0.01%, or at least 10 µg/ml, whichever corresponds to a higher absolute flow rate value.

S10. The Coriolis flow meter system according to any of the preceding system embodiments, wherein the Coriolis flow meter system comprises at least one actuator configured to induce a movement of the tube.

S11. The Coriolis flow meter system according to the preceding system embodiment, wherein the actuator is configured to induce an oscillation of the tube.

S12. The Coriolis flow meter system according to the preceding system embodiment, wherein the oscillation induced by the actuator comprises an actuation frequency, wherein said actuation frequency is in the range of 1 Hz to 5 kHz, preferably 10 Hz to 1 kHz.

S13. The Coriolis flow meter system according to any of the 3 preceding system embodiments, wherein the at least one actuator comprises at least one of an electromagnetic coil and/or a piezo crystal.

S14. The Coriolis flow meter system according to any of the preceding system embodiments and with the features of embodiment S2, wherein the Coriolis flow meter system is configured to provide mass flow data indicative of the determined mass flow rate.

S15. The Coriolis flow meter system according to any of the preceding system embodiments and with the features of S3, wherein the Coriolis flow meter system is configured to provide density data indicative of the determined density.

S16. The Coriolis flow meter system according to any of the preceding system embodiments and with the features of S4, wherein the Coriolis flow meter system is configured to provide volume flow data indicative of the determined volume flow rate.

S17. The Coriolis flow meter system according to any of the preceding system embodiments, wherein the Coriolis flow meter system comprises a data processing unit.

S18. The Coriolis flow meter system according to the preceding system embodiment, wherein the data processing unit comprises a digital signal processor.

S19. The Coriolis flow meter system according to the preceding system embodiment and with the features of S2, wherein each of the plurality of assemblies comprises the features of A41, wherein the data processing unit is configured to determine the mass flow rate based on the detector data of the plurality of assemblies.

S20. The Coriolis flow meter system according to any of the 2 preceding system embodiments and with the features of S3, wherein each of the plurality of assemblies comprises the features of A41, wherein the data processing unit is configured to determine the density based on the detector data of the plurality of assemblies.

S21. The Coriolis flow meter system according to any of the 3 preceding system embodiments and with the features of S4, wherein each of the plurality of assemblies comprises the features of A41, wherein the data processing unit is configured to determine the volume flow rate based on the detector data of the plurality of assemblies.

S22. The Coriolis flow meter system according to any of the 4 preceding system embodiments and with the features of S5, wherein the data processing unit is configured to determine the volume flow rate based on the mass flow rate and the density.

S23. The Coriolis flow meter system according to any of the preceding system embodiments, wherein the Coriolis flow meter system is configured to determine the location of the respective tube assembly of each of the plurality of assemblies.

S24. The Coriolis flow meter system according to any of the preceding system embodiments, wherein the Coriolis flow meter system is configured to determine the oscillation phase and/or frequency of the respective tube assembly of each of the plurality of assemblies.

S25. The Coriolis flow meter system according to the preceding system embodiments and with the features of S17, wherein each of the plurality of assemblies comprises the features of A41, wherein the data processing unit is configured to determine the oscillation phase and/or frequency of the respective tube assembly of each of the plurality of assemblies based on the detector data of the plurality of assemblies.

S26. The Coriolis flow meter system according to any of the preceding system embodiments and with the features of S17, wherein each of the plurality of assemblies comprises the features of A41, wherein the data processing unit is configured to determine the respective location of the tube assembly of each of the assemblies in a direction perpendicular to the first direction (x) based on the detector data of the plurality of assemblies.

S27. The Coriolis flow meter system according to any of the preceding system embodiments and with the features of S10 and S17, wherein the data processing unit is configured to control the at least one actuator.

Below, reference will be made to solvent delivery system embodiments. These embodiments are abbreviated by the letter "D" followed by a number. Whenever reference is herein made to "solvent delivery system embodiments", these embodiments are meant.

D1. A solvent delivery system configured to provide a mixture of at least two solvents, the solvent delivery system comprising at least two pump units,
a mixer, and
at least two Coriolis flow meter systems according to any of the preceding system embodiments.

D2. The solvent delivery system according to the preceding solvent delivery system embodiment, wherein each pump unit comprises an input and an output,
wherein the input of each pump unit is configured to be fluidly connected to at least one solvent reservoir, respectively, and
wherein the output of each pump unit is fluidly connected to the mixer, respectively.

D3. The solvent delivery system according to any of the preceding solvent delivery system embodiments, wherein each of the at least two Coriolis flow meter systems is fluidly connected to a different pump unit.

D4. The solvent delivery system according to any of the preceding solvent delivery system embodiments, wherein each of the at least two Coriolis flow meter systems is located downstream of a respective pump unit and upstream of the mixer, respectively.

D5. The solvent delivery system according to the preceding solvent delivery system embodiment, wherein the solvent delivery system is configured to control the pump units based on flow rates measured by the respective Coriolis flow meter systems.

D6. The solvent delivery system according to the preceding solvent delivery system, wherein the solvent delivery system is configured to provide the mixture of at least two solvents at a desired ratio by controlling the pump units based on the flow rates measured by the respective Coriolis flow meter systems.

D7. The solvent delivery system according to any of the preceding solvent delivery system embodiments, wherein the solvent delivery system is a high-pressure gradient pump.

D8. The solvent delivery system according to any of the preceding solvent delivery system embodiments, wherein the solvent delivery system is configured to provide volume flow rates in the range of 50 µl/min to 2 ml/min, preferably in the range of 50 µl/min to 10 ml/min.

D9. The solvent delivery system according to any of the preceding solvent delivery system embodiments, wherein the solvent delivery system is configured to provide a solvent mixture with an accuracy of at least 1%, preferably at least 0.1%, more preferably at least 0.01% for solvent mixtures comprising at least 1% of each contributing solvent.

D10. The solvent delivery system according to any of the preceding solvent delivery system embodiments, wherein the solvent delivery system is configured for operating pressures exceeding 250 bar, preferably exceeding 500 bar, more preferably exceeding 1000 bar.

D11. The solvent delivery system according to any of the preceding solvent delivery system embodiments, wherein the solvent delivery system further comprises a controller.

D12. The solvent delivery system according to the preceding solvent delivery system embodiment, wherein the controller is operatively connected to the at least two pumping units and to the at least two Coriolis flow meter systems.

D13. The solvent delivery system according to the preceding solvent delivery system embodiment and with the features of D3 or D4, wherein the controller is configured to control the flow rate provided by each pump unit based on data provided by the respective Coriolis flow meter system.

D14. The solvent delivery system according to the preceding solvent delivery system embodiment, wherein the assemblies of the at least two Coriolis flow meter systems comprise the features of embodiment A41, and wherein the data provided by the at least two Coriolis flow meter systems comprise detector data.

D15. The solvent delivery system according to the preceding solvent delivery system embodiment, wherein the controller is configured to determine the location of the tube assembly based on the detector data.

D16. The solvent delivery system according to any of the 3 preceding solvent delivery system embodiments, wherein the controller is configured to determine the mass flow rate, the density and/or the volume flow rate of the fluid at the output of each pump unit based on the data provided by the respective Coriolis flow meter system.

D17. The solvent delivery system according to any of the 4 preceding solvent delivery system embodiments, wherein the least two Coriolis flow meter systems comprise the features of S14, wherein the data provided by the Coriolis flow meter systems comprise mass flow data.

D18. The solvent delivery system according to any of the preceding solvent delivery system embodiments, wherein the least two Coriolis flow meter systems comprise the features of S15, wherein the data provided by the Coriolis flow meter systems comprise density data.

D19. The solvent delivery system according to any of the preceding solvent delivery system embodiments, wherein the least two Coriolis flow meter systems comprise the features of S16, wherein the data provided by the Coriolis flow meter systems comprise volume flow data.

D20. The solvent delivery system according to any of the preceding solvent delivery system embodiments and with the features of D11, wherein the controller comprises at least one data processing unit.

D21. The solvent delivery system according to any of the preceding solvent delivery system embodiments and with the features of D11, wherein the controller is configured to control the solvent delivery system.

D22. The solvent delivery system according to any of the preceding solvent delivery system embodiments, wherein the solvent delivery system further comprises at least two solvent reservoirs.

Below, reference will be made to chromatography system embodiments. These embodiments are abbreviated by the letter "T" followed by a number. Whenever reference is herein made to "chromatography system embodiments", these embodiments are meant.

T1. A chromatography system, wherein the chromatography system comprises at least one assembly according to any of the preceding assembly embodiments, at least one Coriolis flow meter system according to any of the preceding system embodiments, or at least one solvent delivery system according to any of the preceding solvent delivery system embodiments.

T2. The chromatography system according to the preceding chromatography system embodiment, wherein the chromatography system is a liquid chromatography system and preferably a high performance liquid chromatography system.

T3. The chromatography system according to any of the preceding chromatography system embodiments, wherein the chromatography system comprises the at least one solvent delivery system according to any of the preceding solvent delivery system embodiments.

T4. The chromatography system according to any of the chromatography system embodiments T1 and T2, wherein the system comprises at least one pump.

T5. The chromatography system according to the preceding chromatography system embodiment, wherein the at least one pump is configured to provide volume flow rates at least in the range of 50 µl/min to 2 ml/min, preferably in the range of 1 µl/min to 10 ml/min.

T6. The chromatography system according to any of the 2 preceding chromatography system embodiments, wherein the at least one pump comprises an operating pressure range of at least 50 bar to 250 bar, preferably at least of 25 bar to 500 bar, more preferably at least 20 bar to 1500 bar.

T7. The chromatography system according to any of the 3 preceding chromatography system embodiments, wherein each of the at least one assembly or each of the at least one Coriolis flow meter system is located downstream of one of the at least one pump, respectively.

T8. The chromatography system according to any of the 4 preceding chromatography system embodiments, wherein each of the at least one assembly or each of the at least one Coriolis flow meter system is located directly downstream of one of the at least one pump, respectively.

T9. The chromatography system according to any of the preceding chromatography system embodiments, wherein the chromatography system further comprises at least one separation column.

T10. The chromatography system according to the preceding chromatography system embodiment, wherein the at least one assembly or the at least one Coriolis flow meter system is located upstream of the at least one separation column.

T11. The chromatography system according to any of the 2 preceding chromatography system embodiments and with the features of embodiment T3, wherein the at least one separation column is downstream of the at least one solvent delivery system.

T12. The chromatography system according to embodiments T9 or T10 and with the features of embodiment T4, wherein the at least one separation column is located downstream of the at least one pump.

T13. The chromatography system according to any of the preceding chromatography system embodiments, wherein the chromatography system further comprises at least one sampling device.

T14. The chromatography system according to the preceding chromatography system embodiment, wherein the at least one assembly or the at least one Coriolis flow meter system is located upstream of the at least one sampling device.

T15. The chromatography system according to any of the 2 preceding chromatography system embodiments and with the features of T3, wherein the at least one sampling device is located downstream of the at least one solvent delivery system.

T16. The chromatography system according to any of the preceding chromatography system embodiments with the features of embodiments T13 and T4, wherein the at least one sampling device is located downstream of the at least one pump.

T17. The chromatography system according to any of the preceding chromatography system embodiments with the features of embodiments T9 and T13, wherein the at least one sampling device is located upstream of the at least one separation column.

T18. The chromatography system according to any of the preceding chromatography system embodiments, wherein the chromatography system further comprises at least one distribution valve comprising multiple ports and configured to selectively connect ports.

T19. The chromatography system according to the preceding chromatography system embodiment, wherein the at least one assembly or the at least one Coriolis flow meter system is located upstream of the at least one distribution valve.

T20. The chromatography system according to any of the 2 preceding chromatography system embodiments and with the features of T13, wherein each of the at least one sampling device is fluidly connected to a port of one of the at least one distribution valve.

T21. The chromatography system according to any of the 3 preceding chromatography system embodiments and with the features of T9, wherein the at least one distribution valve is located upstream of the at least one separation column.

T22. The chromatography system according to any of the preceding chromatography system embodiments, wherein the chromatography system further comprises at least one trap column.

T23. The chromatography system according to the preceding chromatography system embodiment, wherein the at least one assembly or the at least one Coriolis flow meter system is located upstream of the at least one trap column.

T24. The chromatography system according to any of the 2 preceding chromatography system embodiments and with the features of T9, wherein the at least one trap column is located upstream of the at least one separation column.

T25. The chromatography system according to any of the preceding chromatography system embodiments, wherein the chromatography system further comprises at least one sample loop.

T26. The chromatography system according to the preceding chromatography system embodiment, wherein the at least one assembly or the at least one Coriolis flow meter system is located upstream of the at least one sample loop.

T27. The chromatography system according to any of the 2 preceding chromatography system embodiments and with the features of embodiment T9, wherein at least one the sample loop is located upstream of the at least one separation column.

T28. The chromatography system according to any of the preceding chromatography system embodiments, wherein the chromatography system further comprises at least one chromatography detector.

T29. The chromatography system according to the preceding chromatography system embodiment, wherein the at least one assembly or the at least one Coriolis flow meter system is located upstream of the at least one chromatography detector.

T30. The chromatography system according to any of the 2 preceding chromatography system embodiments and with the features of T9, wherein the at least one chromatography detector is located downstream of at least one of the at least one separation column.

T31. The chromatography system according to any of the preceding chromatography system embodiments, wherein the chromatography system further comprises a system controller.

T32. The chromatography system according to the preceding chromatography system embodiment and with the features of T4, wherein the system controller is operatively connected to the at least one pump and to the at least one assembly or the at least one Coriolis flow meter system.

T33. The chromatography system according to any of the 2 preceding chromatography system embodiments and with the features of T3, wherein the system controller is configured to control the volume flow rate provided by the at least one pump based on data provided by the at least one assembly or the at least one Coriolis flow meter system.

T34. The chromatography system according to the preceding chromatography system embodiment, wherein the at least one assembly comprises the features of A41, wherein the data provided by the at least one assembly or the at least one Coriolis flow meter system comprises detector data.

T35. The chromatography system according to the preceding chromatography system embodiment, wherein the system controller is configured to determine the location of the tube assembly based on the detector data.

T36. The chromatography system according to any of the 3 preceding chromatography system embodiments, wherein the system controller is configured to determine the mass flow rate, the density and/or the volume flow rate based on the data provided by the at least one assembly or the at least one Coriolis flow meter system.

T37. The chromatography system according to any of the preceding chromatography system embodiments and with the features of T33, wherein the chromatography system comprises the at least one Coriolis flow meter system comprising the features of S14, wherein the data provided by the at least one Coriolis flow meter system comprises mass flow data.

T38. The chromatography system according to any of the preceding chromatography system embodiments and with the features of T33, wherein the chromatography system comprises the at least one Coriolis flow meter system comprising the features of S15, wherein the data provided by the at least one Coriolis flow meter system comprises density data.

T39. The chromatography system according to any of the preceding chromatography system embodiments and with the features of T33, wherein the chromatography system comprises the at least one Coriolis flow meter system comprising the features of S16, wherein the data provided by the at least one Coriolis flow meter system comprises volume flow data.

T40. The chromatography system according to any of the preceding chromatography system embodiments and with the features of T31, wherein the system controller comprises at least one data processing unit.

T41. The chromatography system according to any of the preceding chromatography system embodiments and with the features of T31, wherein the system controller is configured to control the chromatography system.

T42. The chromatography system according to any of the preceding chromatography system embodiments, wherein the chromatography system is configured to operate at pressures of at least up to 50 bar, preferably at least up to 250 bar, more preferably at least up to 500 bar, such as at least up to 1000 bar or 1500 bar.

Below, reference will be made to method embodiments. These embodiments are abbreviated by the letter "M" followed by a number. Whenever reference is herein made to "method embodiments", these embodiments are meant.

M1. A method, wherein the method uses the Coriolis flow meter system according to any of the preceding system embodiments, wherein the method comprises guiding electromagnetic radiation emitted by the source through the source optical element and in the direction of the detector assembly for each assembly comprised by the Coriolis flow meter system, respectively.

M2. The method according to the preceding method embodiment, wherein the method comprises causing a fluid to flow through the tube.

M3. The method according to the preceding method embodiment, wherein the method further comprises
in a first flow step, causing a fluid to flow through the tube with a flow rate in the range of 50 µl/min to 500 µl/min, preferably 50 µl/min to 150 µl/min, and
in a second flow step, causing a fluid to flow through the tube with a flow rate in the range of 1 ml/min to 5 ml/min, preferably 2 ml/min to 5 ml/min.

M4. The method according to any of the 2 preceding embodiments, wherein the fluid is at a pressure exceeding 10 bar, preferably exceeding 100 bar, more preferably 500 bar, such as exceeding 1000 bar.

M5. The method according to any of the preceding method embodiments, wherein the method further comprises inducing an oscillation of the tube at an actuation frequency.

M6. The method according to the preceding method embodiment, wherein the actuation frequency is in the range of 1 Hz to 5 kHz, preferably 10 Hz to 1 kHz.

M7. The method according to any of the preceding method embodiments, wherein the method comprises detecting the amount of electromagnetic radiation reaching the respective detector of the plurality of assemblies and generating corresponding detector data.

M8. The method according to the preceding method embodiment, wherein the method further comprises determining a flow rate based on the detector data.

M9. The method according to the preceding method embodiment, wherein the step of determining the flow rate comprises determining at least one of a mass flow rate and a volume flow rate.

M10. The method according to the preceding method embodiment, wherein the step of determining the flow rate further comprises determining a density of the fluid based on the detector data.

M11. The method according to any of the 3 preceding method embodiments, wherein the step of determining the flow rate comprises determining a respective location of the tube assembly of each of the plurality of assemblies at least with respect to a direction perpendicular to the first direction (x) based on the detector data.

It will be understood that for each of the plurality of assemblies comprised by the system, the respected first direction (x) may be oriented in different directions with respect to each other, based on the relative orientation within the system.

M12. The method according to any of the 4 preceding method embodiments, wherein the step of determining the flow rate further comprises determining a respective oscillation frequency and/or phase of the tube assembly of each of the plurality of assemblies based on the detector data.

M13. The method according to the preceding method embodiment, wherein the step of determining the flow rate comprises comparing the phase of the oscillation of the respective tube assemblies.

M14. The method according to any of the 2 preceding method embodiments and with the features of M5 and M10, wherein determining the density of the fluid comprises determining the resonance frequency of the tube assembly.

S28. The Coriolis flow meter system according to any of the preceding system embodiments, wherein the system is configured to perform the method according to any of the preceding method embodiments.

S29. The Coriolis flow meter system according to the preceding system embodiment and with the features of S17, wherein the data processing unit is configured to perform and/or control any of the method steps according to M5 to M14.

Below, reference will be made to use embodiments. These embodiments are abbreviated by the letter "U" followed by a number. Whenever reference is herein made to "use embodiments", these embodiments are meant.

U1. Use of the assembly according to any of the preceding assembly embodiments or the Coriolis flow meter system according to any of the preceding system embodiments to determine the mass and/or volume flow rate of a fluid being guided through the tube.

U2. Use according to the preceding use embodiment in chromatography.

U3. Use according to the preceding use embodiment in liquid chromatography.

U4. Use according to the preceding use embodiment in high performance liquid chromatography.

U5. Use according to the preceding use embodiment in ultra-high performance liquid chromatography.

Embodiments of the present invention will now be described with reference to the accompanying drawings. These embodiments should only exemplify, but not limit, the present invention.

Figure 2:
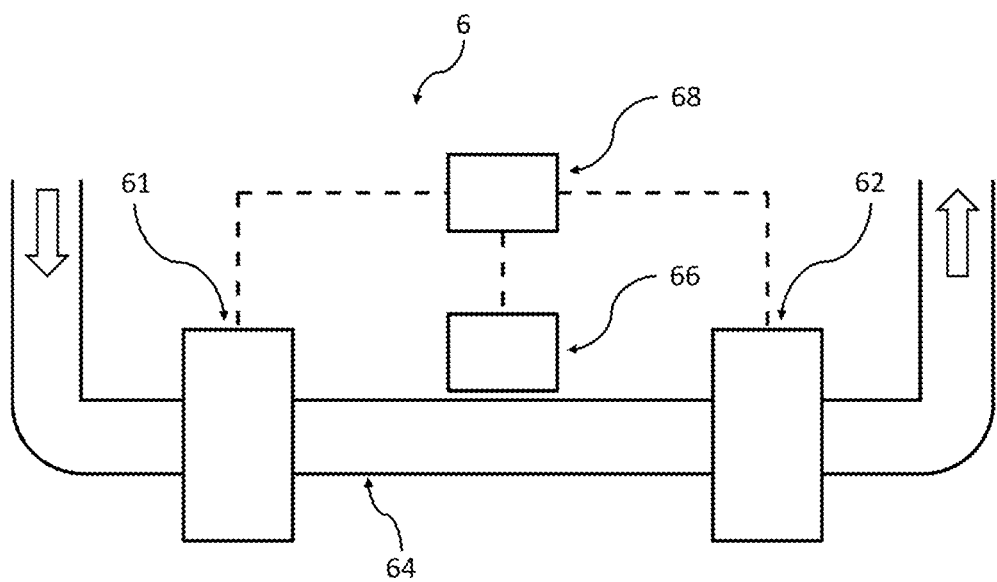
Figure 3:
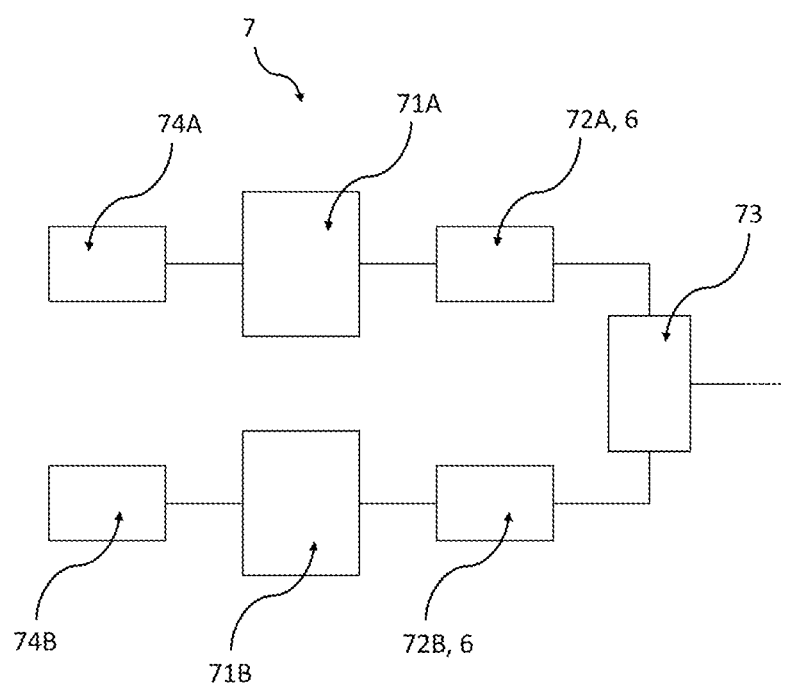

FIG. 2 schematically depicts a Coriolis flow meter system according to the present invention; and FIG. 3 schematically depicts a solvent delivery system according to embodiments of the present invention.

It is noted that not all the drawings carry all the reference signs. Instead, in some of the drawings, some of the reference signs have been omitted for the sake of brevity and simplicity of the illustration. Embodiments of the present invention will now be described with reference to the accompanying drawings.

Reference will now be made to FIGS. 1a to 1d, depicting embodiments of an assembly according to the present invention. Generally, the assembly may also be referred to as a movement sensor, particularly for a Coriolis mass flow meter. Generally, the assembly comprises a source 1 for electromagnetic radiation, e.g. a light source 1, at least one source optical element 5, configured to transmit electromagnetic radiation received at a receiving end 51 of the source optical element 5 to an emitting end 52 of the source optical element 5, and a detector assembly 2 comprising a detector 21, e.g. detector 21, configured to detect electromagnetic radiation, which may also simply be referred to as radiation, or light.

The detector assembly 2 is positioned such that at least a part of the electromagnetic radiation from the source 1 is received by the detector 21 (i.e. at least if no tube assembly 4 is present). In particular, the detector assembly 2 comprises a detector assembly receiving end 22, wherein part of the electromagnetic radiation received at the detector assembly receiving end 22 is received by the detector 21. That is, generally the detector assembly receiving end 22 is positioned such that at least part of the electromagnetic radiation emitted by the source 1 reaches the detector 2. In particular, the detector assembly receiving end 22 may be arranged such that at least a portion of electromagnetic radiation originating from the emitting end 52 of the source optical element 5 reaches the detector assembly receiving end 22. Thus, at least a portion of electromagnetic radiation originating from the emitting end 52 reaches the detector 21, i.e. is received by the detector 21. The light path between the emitting end 52 and the detector assembly receiving end 22 may define a first direction (x) for the assembly.

It will be understood that in an embodiment, wherein the detector assembly 2 merely comprises a detector 21, the detector assembly receiving end 22 may be a portion of the detector 21, e.g. an active detection surface of the detector 21.

Thus, source 1, detector assembly 2 and source optical element 5 may provide a light barrier, which may for example be configured to detect the presence or absence of an obstacle within the light path in the first direction (x) and/or any movement of an element through the light path, e.g. perpendicular to the first direction x.

Furthermore, the assembly comprises a tube assembly 4, comprising a portion of a tube. The tube assembly 4 is positioned between the emitting end 52 and the detector assembly receiving end 22 in the first direction (x). As a mere example in FIG. 1a, 1c, and FIG. 1d the distance between the emitting end 52 and the detector assembly receiving end 22 can be 3 mm and the distance between the source 1 and the emitting end 30 mm. Thus, in such a configuration, if the x-position of the emitting end 52 is considered to be at 0 mm, the x-position of the detector assembly receiving end 22 would be 3 mm and the tube assembly would be located along this x direction at an x-position between 0 mm and 3 mm. Further, the tube assembly 4 is movable, i.e. it is configured such that it can change its position within the assembly. Therefore, the amount of electromagnetic radiation received by the detector assembly 2 and consequently the detector 21 depends on the position of the tube assembly 4 relative to the detector assembly receiving end 22 and/or the emitting end 52 of the source optical element 5.

Thus, during operation, the position of the moving, e.g. oscillating, tube assembly 4 may generally be deduced from the amount of electromagnetic radiation that is detected by the detector 21. That is, in a configuration wherein the tube assembly 4 is not within the light path of the assembly, i.e. the path that the electromagnetic radiation of the source 1 travels in the first direction (x) when leaving the emitting end 52 of the source optical element 5 and prior to hitting the detector assembly receiving end 22, a maximum amount of electromagnetic radiation may arrive at the detector 21. If the tube assembly 4 however moves into said light path, it may block at least a portion of the electromagnetic radiation coming from the source 1, wherein the amount of radiation blocked may depend on the position of the tube assembly 4. Thus, a movement of the tube assembly 4 may be deduced from the shading of the detector assembly receiving end 22 and the consequently lower amount of electromagnetic radiation being received by the detector 21.

In other words, the tube assembly 4 whose position (or movement) is to be determined may be located between the source 1, and particularly the emitting end 52 of the source optical element 5, and the detector assembly 2, and particularly the detector assembly receiving end 22. The tube assembly 4 may thus partially shade the electromagnetic radiation, e.g. the light beam. The position (or movement) of the tube assembly 4 can thus be deduced from the amount of radiation being received by the detector assembly 2, respectively the detector 21.

While this may not allow for an absolute determination of the position, e.g. if the detector 21 has no spatial resolution, the measured signal may not be unique to a position of the tube, the deduced signal may still allow to determine or at least approximate characteristics of the movement of the tube assembly 4. That is, the shading may be mirror symmetric with respect to the position at which the tube assembly 4 is in a centre of the light path, e.g. where the electromagnetic radiation reaching the detector 21 is minimal, but it may still allow to determine or at least approximate characteristics of the movement of the tube assembly 4, e.g. an oscillation frequency of the tube assembly 4 and/or a phase of said oscillations.

The portion of the tube may be configured to withstand pressures of a fluid being guided through the portion of the tube of at least 50 bar, preferably at least 500 bar, more preferably at least 1000 bar, such as 1500 bar. In other words, the portion of the tube may be configured to withstand said fluidic pressures of a fluid being guided through the portion of the tube. This may advantageously render the tube assembly 4 suitable for use in chromatography applications and preferably in high performance liquid chromatography (HPLC).

The source 1 may for example be a light-emitting diode (LED), especially an infrared LED (IR-LED). Generally, the source 1 may emit electromagnetic radiation at an emission wavelength. That is, the emission of the source 1 may be centred around an emission wavelength or, in some cases, around a plurality of emission wavelengths. Some sources may comprise a broad spectrum, e.g. a spectrum approximately covering the visible range of the spectrum, wherein other sources may comprise a relatively narrow spectral bandwidth, e.g. FWHM of around 20 to 30 nm. The emission wavelength of an IR-LED may be in the range of 700 nm to 1400 nm, preferably in the range of 800 nm to 1000 nm. Such IR-LEDs may for example comprise a spectral bandwidth in the range of 20 nm to 150 nm.

The detector 21 may generally be semiconductor based and preferably be a photodetector. For example, the detector 21 may comprise a photodiode, such as a pinned photodiode, an avalanche photodiode (APD), or preferably a PIN photodiode. In some embodiments, the detector 21 may comprise a photodiode array, which may advantageously provide spatial resolution. However, it may also be any other suitable device for detecting electromagnetic radiation such as a photo transistor, an image sensor, e.g. an active-pixel sensor (APS) such as a CMOS sensor, or a charge-coupled device (CCD).

In some embodiments, at least one aperture 3a, 3b may be fitted on either or both sides of the tube assembly 4. That is, the at least one aperture 3a, 3b may be located between the emitting end 52 and the tube assembly 4 (aperture 3a) and/or between the tube assembly 4 and the detector assembly receiving end 22 (aperture 3b) in the first direction (x). Such apertures 3a, 3b may advantageously block stray lights and define the light path through which the tube assembly 4 may move. That is, utilising at least one aperture, the light path between the source optical element 5 and the detector assembly 2, and particularly the portion of the light path that the tube assembly 4 may move through, may be defined more clearly and precisely compared to not using apertures 3a, 3b since only electromagnetic radiation in a particular location and/or traveling in a particular direction may be guided through said at least one aperture 3a, 3b. This may advantageously allow to improve the measurement accuracy.

The at least one aperture 3a, 3b may for example be a slit, a pinhole, or a diaphragm, i.e. a thin opaque structure with an opening at its centre, e.g. an iris diaphragm. It will be understood that in this context the term opaque is to be understood with reference to the electromagnetic radiation emitted by the source 1. That is, the aperture may generally be designed to block parts of the electromagnetic radiation emitted by the source and guided through the source optical element 5. Particularly, the aperture may not be required to be opaque for light in the visible range, i.e. to a human eye the aperture may not appear to be opaque. Again, being "opaque", respectively blocking parts of the electromagnetic radiation refers to suppressing the transmission of said parts of the electromagnetic radiation by at least a factor 10.

Additionally or alternatively, the tube assembly 4 may comprise a flag (not shown), wherein the flag may be attached to the portion of the tube comprised by the tube assembly 4. The flag may for example be any kind of sheet, plate and/or cover that can be attached to the tube to advantageously provide a more defined edge and/or cross-section for varying the amount of electromagnetic radiation received by the detector assembly 2 when moving. In other words, the portion of the tube comprised by the tube assembly 4, may be fitted with a flag, wherein the flag may be configured to shade the detector assembly receiving end 22, when the tube assembly 4 is moving. That is, instead of the tube itself, the flag may be moving through the light path and partially block the light path depending on the position of the tube assembly 4. This may be advantageous, as a flag may provide a more uniform surface for blocking at least a portion of the electromagnetic radiation compared to a tube, which may typically comprise a generally round shape, which may for example be less defined around the edges. In other words, a flag may optionally be attached to the tube to optimise shading. The flag may thus be opaque with respect to the electromagnetic radiation emitted by the source, i.e. the flag may be configured to block electromagnetic radiation emitted by the source and transmitted through the source optical element 5 to thus provide the desired shading.

Figure 1A:
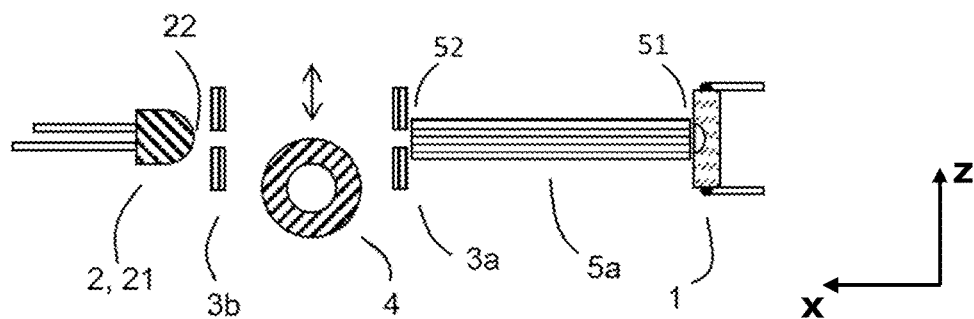
FIG. 1a depicts an assembly according to an embodiment of the present invention.
Figure 1B:
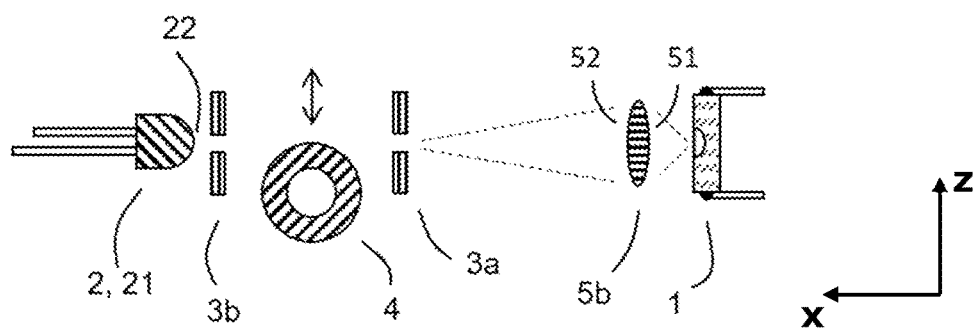
FIG. 1b depicts an assembly according to another embodiment of the present invention.

The at least one source optical element 5, 5a is placed between the source 1 and the tube assembly 4 and/or detector assembly 2 as shown in FIG. 1a. Very generally, the source optical element 5 is configured to receive electromagnetic radiation of the source 1 at its receiving end 51, transmit the electromagnetic radiation to an emitting end 52, and emit the electromagnetic radiation at the emitting end 52. That is, very generally, the source optical element 5 may transmit, e.g. guide, the electromagnetic radiation emitted by the source 1 into the direction of the detector assembly 2 and particularly the detector assembly receiving end 22. It will be understood that the emitting end 52 emitting the transmitted electromagnetic radiation does not necessarily involve an active step, such as for example for the source 1 to emit, i.e. create, electromagnetic radiation. The emitting end 52 merely "releases" the transmitted electromagnetic radiation, which is referred to as emitting and/or radiating the electromagnetic radiation.

The source optical element 5 may for example be a waveguide, such as a light pipe 5a (see FIG. 1a), which may also be referred to as light tube. Similarly, the source optical element may be a lens 5b (see FIG. 1b), preferably a convex lens, or an optical fibre 5c (see FIG. 1c). Generally, the source optical element 5 may be optimized and/or adapted to the emission wavelength of the source 1.

An optical element, such as the source optical element 5, may generally be configured to transmit electromagnetic radiation at at least one transmission wavelength. That is, the optical element 5 may for example be adapted and/or optimized for transmission at at least one transmission wavelength. The transmission may for example be broadband, i.e. comprise a broad spectral bandwidth, or comprise a narrow bandwidth, e.g. tens of nm. An optical element with a designated transmission wavelength and a corresponding spectral bandwidth may for example further work as a filter of undesired electromagnetic radiation.

In particular, the at least one source optical element 5 is a difference to known fork light barriers. In particular, the addition of at least source one optical element 5 may advantageously allow to increase a distance between the source 1 and the tube assembly 4, therefore allowing to reduce the amount of heat originating from the source 1 that reaches the tube assembly 4 and therefore reducing the problems associated with a heating of the tube, e.g. change of Young modulus of the tube assembly 4 and particularly also an inhomogeneous Young modulus of the tube assembly 4, which may impair the accuracy and/or precision of the measurement of location/position, oscillation frequency and/or oscillation phase. This is particularly advantageous as LEDs for example typically only convert about 10% of the supplied electric energy into usable electromagnetic radiation, while the remaining energy is emitted as heat to the environment of the (light) source, wherein said heat may also be referred to as waste heat. The waste heat not only reduces the efficiency of the source 1 but also heats the tube assembly in known optical Coriolis mass flow meters, which utilize fork light barriers.

Put differently, the at least one source optical element 5 may allow for a distance between the source 1 and the tube assembly 4 that strongly suppresses and ideally basically suppresses any heat dissipation between source 1 and tube assembly 4. That is, a significant fraction of the thermal radiation, e.g. most of it, such as more than 75% preferably more than 90% may be absorbed by the at least one source optical element 5. Heat dissipation due to convection and heat conduction may also be strongly reduced due to the greater distance. In such a case, heat transfer between the source 1 and the tube assembly may (ideally only) occur through the electromagnetic radiation used for detection, e.g. near infrared light. However, most of said electromagnetic radiation may be reflected when hitting the tube assembly 4, particularly when choosing suitable tube materials such as metal. Thus, even the electromagnetic radiation utilized for detection may not cause significant heating of the tube assembly 4 as such heating would require absorption of the radiation. The suppression of heat transfer from the source 1 to the tube assembly 4 may thus advantageously increase the measurement accuracy by a significant factor, e.g. a factor 10 or even more.

In other words, embodiments of the present invention may comprise at least one source optical element 5, which is placed between the source 1, e.g. light source, and the aperture 3a or tube assembly 4. Said at least one source optical element 5 may be configured to transmit the light of the source 1 with low loss while enabling an increased separation between the source 1 and the tube assembly 4. The at least one source optical element 5, 5a, 5b, 5c may for example be a light guide 5a, e.g. a rigid light guide or a (flexible) optical fibre 5c, or a convex lens 5b. Therefore, embodiments of the present invention may provide certain advantages over the known prior art. First of all, due to the increased separation of source 1 and tube assembly 4, the at least one source optical element 5 may decrease the amount of waste heat of the source 1 reaching the tube assembly 4 or even completely suppress it. Thus, the measurement may be less sensitive to the heat of the source 1. Furthermore, the source optical element 5 may allow for a more flexible design and construction of the assembly, e.g. of the light barrier, and the overall Coriolis mass flow meter, since the at least one source optical element 5 may allow for placing the source 1 in a location spatially separated from the tube assembly (cf. FIG. 1c). Thus, the addition of the at least one source optical element 5 may not only reduce the influence of the heat of the source 1 and thus improve the measurement accuracy, but also provide for an improved design flexibility as there may be less constraints as to where the source 1 is placed relative to the tube assembly and the detector assembly 2. In principle, utilizing suitable optical elements as source optical elements, a single source 1 may even be utilized in two (or more) such assemblies, e.g. in two light barriers. That is, a plurality of assemblies may share a single source 1 by guiding a fraction of the emitted electromagnetic radiation to the respective detector assemblies 2 by means of the respective source optical elements 5.

While the at least one source optical element 5 (and more generally any optical element) may introduce some loss, i.e. not all of the electromagnetic radiation received at its receiving end 51 may successfully be transmitted through the source optical element 5 and be emitted at its emitting end 52, it may still significantly improve the amount of electromagnetic radiation reaching the detector 21 compared to increasing the distance between the source 1 and the tube assembly 4, respectively the detector assembly 2 with the electromagnetic radiation traveling in free space. That is, in fork barriers used in the state of the art, the distance between source and detector may typically be about 3 mm. However, the intensity of the electromagnetic radiation of a point source, e.g. an LED, decreases quadratically with distance. Thus, if the distance between the source and detector would be increased to 30 mm (i.e., tenfold), about 99% of the electromagnetic radiation would be lost compared to the original configuration and consequently only about 1% of the electromagnetic radiation would reach the detector. On the opposite, for example a waveguide may lose around 50% of the electromagnetic radiation such that the intensity of the electromagnetic radiation reaching the detector would still be 50 times higher than without using the waveguide. Most of such losses may potentially occur due to reflections at the receiving end and the emitting end of the source optical element, e.g. the waveguide, and at the apertures if used. Furthermore, as the waste heat of the source may not be transferred or at least be significantly suppressed, one may also use a more powerful source, which may compensate for at least some of the losses.

In other words, a source optical element 5 may be placed between the source 1 and the optional aperture 3a or tube assembly 4, wherein the source optical element 5 may transmit the electromagnetic radiation with low loss compared to the electromagnetic radiation travelling in free space, e.g. a loss of about 50%, and at the same time allow for a spatial distance between source 1 and aperture 3a or tube assembly 4. The spatial distance may prevent the waste heat from the source 1 from acting directly on the tube assembly 4. Thus, the embodiments of the present invention may separate the waste heat from the useful electromagnetic radiation in such a way that the tube assembly is not heated more than necessary for the optical measurement and in particular less than for known light barriers.

Therefore, embodiments of the present invention may advantageously allow for an accurate and effective flow sensor for a flow rate range relevant to HPLC, e.g. 50 µl/min to 5 ml/min.

Experiments have shown that the present invention allows for reducing the heating of the tube assembly by a factor of about 10 for the same (light) intensity on the detector 21. This may advantageously allow for a more accurate density and/or flow measurement and suppress the occurrence of a non/linearity in the low flow rate range.

Figure 1C:
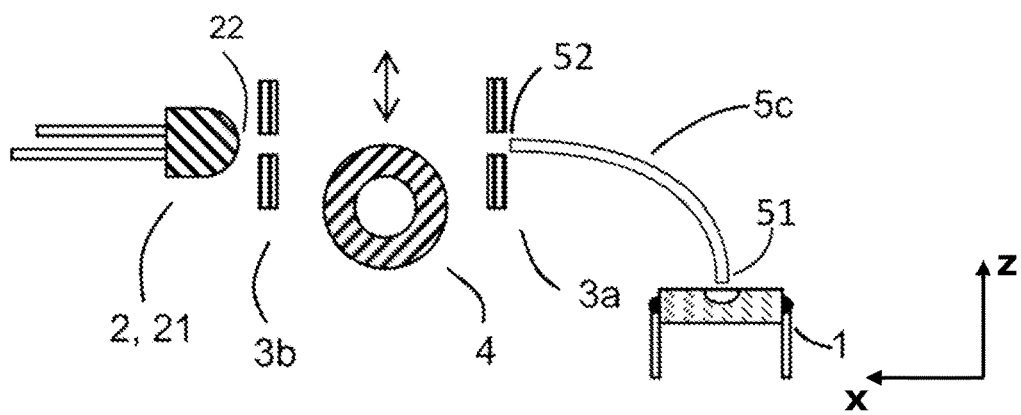
FIG. 1c depicts an assembly according to yet another embodiment of the present invention.
Figure 1D:
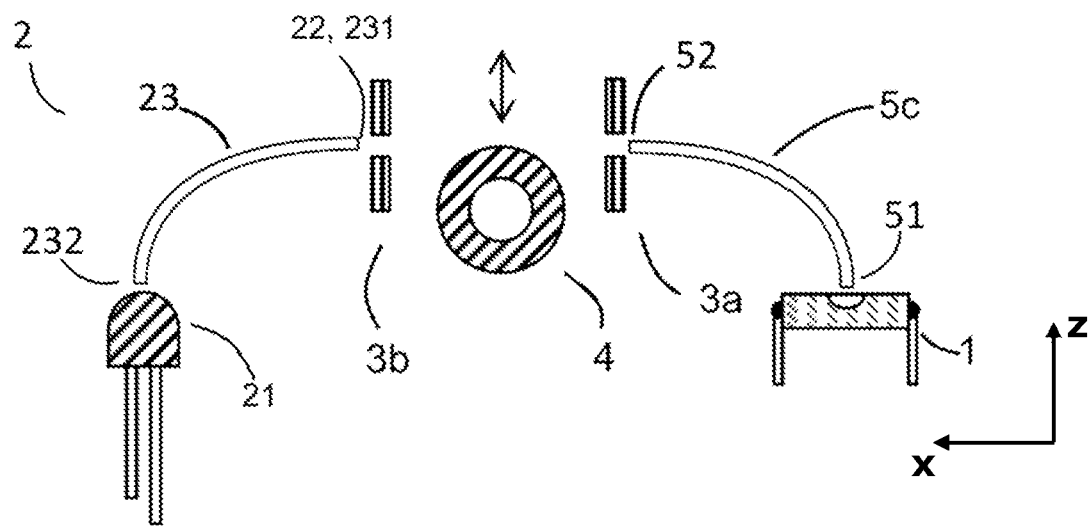
FIG. 1d depicts an assembly according to a further embodiment of the present invention.

With reference to FIG. 1d, the detector assembly 2 may in some embodiments further comprise a detector optical element 23. Similar to the source optical element 5, the detector optical element 23 may comprise a detector optical element receiving end 231 and a detector optical element emitting end 232. The detector optical element 23 may be configured to transmit electromagnetic radiation received at the detector optical element receiving end 231 to the detector optical element emitting end 232.

The detector optical element receiving end 231 may constitute the detector assembly receiving end 22 and may be configured to receive electromagnetic radiation emitted by the emitting end 52 of the source optical element 5.

The detector optical element emitting end 232 may be configured to emit the transmitted electromagnetic radiation and the detector 21 may be configured to receive at least part of the electromagnetic radiation emitted by the detector optical element emitting end 232.

It will be understood by a person skilled in the art that the detector optical element 23 may generally be an optical element with identical or similar features as the source optical element 5 described herein. Thus, it will be understood that explanations and observations made regarding the source optical element 5 may analogously apply to the detector optical element 23. In other words, the detector optical element 23 may comprise the same or similar features to the source optical element 5 described herein.

In particular, the detector optical element 23 may for example be a waveguide, such as a light pipe (cf. FIG. 1a), or an optical fibre (cf. FIGS. 1c, 1d). Similarly, the detector optical element 23 may be a lens (cf. FIG. 1b), preferably a convex lens. Generally, the detector optical element 23 may be optimized and/or adapted to the emission wavelength of the source 1.

The detector assembly 2 comprising a detector optical element 23 advantageously allows for a more flexible design and construction of the assembly, e.g., of the light barrier, and the overall Coriolis mass flow meter, since the detector optical element 23 may allow for placing the detector 21 in a location spatially separated from the tube assembly 4 (cf. FIG. 1d). In other words, the inclusion of a detector optical element 23 provides for an improved design flexibility as there may be less constraints as to where the detector 21 is placed relative to the tube assembly 4 and the emitting end 52 of the source optical element 5.

Very generally, a plurality of the above-described assemblies may be utilized in a Coriolis mass flow meter as known in the state of the art, particularly in Coriolis mass flow meters that currently rely on fork light barriers such as the Coriolis mass flow sensors disclosed in EP 1 719 982 B1 and EP 1 719 983 B1.

That is, embodiments of the present invention may also relate to a Coriolis flow meter system comprising a plurality of assemblies as described above with reference to FIGS. 1a to 1d, e.g. 2 or 3 such assemblies, wherein the Coriolis flow meter system comprises a tube and wherein the respective portion of the tube comprised by the tube assembly of each assembly is part of said tube.

More specifically, and with reference to FIG. 2, a Coriolis flow meter system 6 may comprise a plurality of assemblies 61, 62 as described above, which share a common tube 64. That is, the respective tube assemblies 4 of the assemblies 61 and 62 each comprise a portion of the same tube 64, such that a fluid may for example first flow through a first assembly 61 comprising a first tube assembly 4 and subsequently through a second assembly 62 comprising a second tube assembly 4. The flow of fluid through the tube is indicated by the large arrows. Thus, the first assembly 61 is upstream of the second assembly 62. The Coriolis flow meter system 6 may further comprise an actuator 66, configured to induce a movement of the tube 64. Preferably, the actuator 66 may be configured to induce an oscillation of the tube 64, which may comprise an actuation frequency that may be in the range of 1 Hz to 5 kHz, preferably 10 Hz to 1 kHz. The actuator 66 may for example comprise an electromagnetic coil, which may be configured to induce an oscillation of the tube 64 by means of magnetic repulsion and/or attraction exerted on the tube 64. Alternatively, the actuator 66 may for example be a piezo actuator, i.e. it may comprise a piezoelectric crystal. A piezoelectric crystal may be mechanically strained through application of an electric field through the reverse piezoelectric effect. Thus, by applying alternating electric field the piezoelectric crystal may cause an oscillatory change of the dimensions of the piezo crystal, which may in turn be used to induce a desired oscillation of the tube 64 through a mechanical coupling.

The tube 64 may generally be configured for HPLC applications, that is the tube 64 may be configured to withstand pressures of at least 50 bar, preferably at least 100 bar, more preferably at least 1000 bar, such as 1500 bar.

Each of the assemblies 61, 62 may be configured to provide detector data of the respective detector 21 and the Coriolis flow meter system may generally be configured to determine a mass flow rate and/or a density of a fluid being guided through the tube 64. In some embodiments, the Coriolis flow meter system 6 may be configured to determine the volume flow rate of the fluid being guided through the tube 64, e.g. based on a determined mass flow rate and density. The Coriolis flow meter system may advantageously be configured to determine the volume flow rate of a fluid over the complete range of 50 µl/min to 5 ml/min, preferably 1 µl/min to 10 ml/min, more preferably 100 nl/min to 10 ml/min.

The Coriolis flow meter system 6 may for example comprise a data processing unit 68 which may be configured to receive detector data from the assemblies 61, 62 and/or be configured to control the actuator 66. In particular, the data processing unit may be configured to determine the mass flow rate, the density and/or the volume flow rate of a fluid being guided through the tube 64 based on the detector data. For example, the data processing unit may determine the oscillation frequency and/or phase of the tube at the position of the first assembly 61 and the second assembly 62 and determine the mass flow rate based on a phase difference between the oscillations of the tube 64 in the respective locations. Similarly, the data processing unit 68 may determine the phase difference between the actuation oscillation and the oscillation of the tube, which may enable the data processing unit to determine the resonance frequency of the tube and the density of the fluid.

In other words, since the oscillation of the tube may be an oscillation forced by the actuator, the oscillation frequency of the tube and the actuation frequency are substantially equal. However, there may be a phase difference between the oscillation of the actuator and the oscillation of the tube. If the phase difference is 90°, the oscillations are in resonance. Thus, a feedback loop may for example be utilized to control the actuation frequency to be in resonance with the tube assembly, since an extremely strong actuator would otherwise be required to achieve the desired amount of oscillation of the tube assembly. The resonance frequency is then a measure for the density as it depends on the overall mass of the tube assembly and the fluid and since the internal fluid volume of the tube is fixed it may thus allow to determine the fluid's density.

Alternatively, the Coriolis flow meter system 6 may merely provide the data required to determine the mass flow rate, the density and/or the volume flow rate, e.g. the detector data and the actuation frequency, which may in turn be evaluated by a controller and/or data processing unit, e.g. of a chromatography system.

It will be understood by the person skilled in the art that the Coriolis flow meter system 6 schematically shown in FIG. 2 merely serves as an example and that the assemblies according to the present invention may be combined with known Coriolis mass flow meter systems, particularly known Coriolis mass flow meter systems utilizing fork light barriers.

With reference to FIG. 3, an embodiment of the present invention further relates to a solvent delivery system 7 comprising at least two pump units 71, 71A, 71B, a mixer 73 and at least two Coriolis flow meter systems 6, 72A, 72B. The solvent delivery system may generally be configured to provide a mixture of two solvents.

A pump unit 71 may generally be an individual pump or a pump channel within a multichannel pump, e.g. a pump head. Each pump unit 71 may comprise an input and an output, wherein the input of each pump unit 71, 71A, 71B is configured to be fluidly connected to at least one respective solvent reservoir 74, 74A, 74B.

The solvent reservoirs 74 may either be comprised by the solvent delivery system 7 or be external to the solvent delivery system 7. In some embodiments, solvent reservoirs 74 may comprise a plurality of different solvents and at least one valve for selectively coupling one of the solvents to the input of the respective pump unit 71.

The output of each pump 71 may be fluidly connected to the mixer 73, wherein the mixer may be configured to provide at its output a mixture of the solvents provided to its inputs. In particular, the mixer 73 may thus provide longitudinal and/or transversal mixing of fluids.

Furthermore, each of the Coriolis flow meter systems 6, 72A, 72B may be fluidly connected to a different pump unit 71. For example, in the depicted embodiment, the pump unit 71A is fluidly connected to the Coriolis flow meter system 72A, while the pump unit 71B is fluidly connected to the Coriolis flow meter system 72B. Preferably, each of the Coriolis flow meter systems 72A, 72B are fluidly connected to the output of the respective pump unit 71A, 71B. In other words, the Coriolis flow meter systems 72, 72A, 72B are preferably located downstream of the respective pump unit 71, 71A 71B and upstream of the mixer 73.

Overall, the solvent delivery system may be a high-pressure gradient pump. Additionally or alternatively, the solvent delivery system may be a binary pump for LC, HPLC and/or UHPLC.

During operation, each pump unit 71, 71A, 71B may draw a respective solvent from the solvent reservoir 74, 74A, 74B connected to its input and provide the pressurized solvent to the mixer 73 wherein the solvents of the pump unit 71, 71A, 71B may be mixed to provide a solvent mixture. The provided solvent mixture may for example be used in a HPLC-system.

The Coriolis flow meter systems 72, 72A 72B may measure the flow rate of the provided solvent and provide a respective feedback to the pump unit 71, 71A, 71B, such that operation of the pump units 71, 71A, 71B can be adjusted based on the measured flow rates in order to provide a desired solvent mixture with high accuracy. That is, by actively controlling the flow rate of the solvents provided by the respective pump units 71, 71A, 71B, the mixing ratio of the solvent mixture provided at the output of the mixer 73 can be controlled to a high level of accuracy. The Coriolis flow meter systems 6, 72A, 72B may advantageously allow to accurately and reliably measure the flow rate over a wider range than currently known in the state of the art, e.g. for volume flow rates at least over the complete range of 50 µl/min to 5 ml/min, preferably over the complete range of 1 µl/min to 10 ml/min, more preferably over the complete range of 100 nl/min to 10 ml/min.

Thus, incorporating the assembly and more particular the described Coriolis flow meter system into a solvent delivery system may provide a solvent delivery system that is advantageously configured to provide desired solvent mixtures over a large range of flow rates, e.g. 1 µl/min to 10 ml/min, and with high accuracy. Advantageously, the accuracy may remain constant over time and may not be degraded by small leaks at piston seals or in check valves which may typically occur due to regular wear.

Such systems may for example be used for providing solvent gradients, wherein the mixing ratio of the solvent mixture is (continuously) altered throughout a measurement run, wherein high accuracy of the mixing ratio is required for reliable analysis results.

The present invention further relates to a chromatography system comprising an assembly according to the present invention or the Coriolis flow meter system 6 according to the present invention. The chromatography system may be a liquid chromatography system and preferably a high performance liquid chromatography system.

The chromatography system (not shown) may generally comprise a pump for supplying a fluid stream, typically a pressurized fluid stream at a designated flow rate. The flow rate may be controlled through an active feedback loop comprising a mass or volume flow rate measured downstream of the pump by the Coriolis flow meter system 6 and/or utilizing at least one assembly according to the present invention. Thus, the Coriolis flow meter system 6 and/or the assembly according to the present invention which is comprised by the chromatography system may be located downstream of the pump.

In some embodiments, the assembly and/or the Coriolis flow meter system 6 may be located directly downstream of the pump, i.e. such that only fluid connections are located between the pump and the assembly or Coriolis flow meter system. Particularly, there may be no system components other than tubes and/or connectors between the pump and the assembly or Coriolis flow meter system.

The chromatography system may typically further comprise at least one separation column, which is located downstream of the pump. The assembly and/or Coriolis flow meter system may be located upstream of the separation column.

Furthermore, the system may also comprise a sampling device, which may be configured to introduce a sample into the fluid stream provided by the pump, which is to be separated in the separation column. Thus, the sampling device may be located downstream of the pump and upstream of the separation column. The assembly and/or Coriolis flow meter system 6 may be located upstream of the sampling device.

The chromatography system may further comprise at least one distribution valve comprising multiple ports out of which the valve may selectively connect ports, typically in pairs. The at least one distribution valve may be located upstream of the separation column and downstream of the pump. For example, the sampling device may be connected to some of the ports of the distribution valve. The Coriolis flow meter system may be located upstream of the distribution valve.

Further components that may be comprised by the chromatography system include a chromatography detector, typically located downstream of the separation column, a trap column and/or a sample loop, both typically located upstream of the separation column.

Furthermore, the chromatography system may comprise a controller, which may be operatively connected to the pump and the assembly and/or Coriolis flow meter system. Thus, the controller may for example be configured to control the volume flow rate and/or mass flow rate provided by the pump based on data received from the assembly and/or the Coriolis flow meter system, e.g. detector data and actuation frequency or data on a mass flow rate, volume flow rate and/or density determined by the Coriolis flow meter system.

Very generally, the controller may be configured to control the chromatography system e.g. the pump, the sampling device, the distribution valve the chromatography detector and/or the Coriolis flow meter system.

Furthermore, the chromatography system may be configured to operate at pressures of at least up to 50 bar, preferably at least up to 250 bar, more preferably at least up to 500 bar, such as at least up to 1000 bar or 1500 bar, and/or volume flow rates at least in the range of 50 µl/min to 5 ml/min.

Overall, the present invention may thus allow for precise position measurement of a tube assembly, e.g. a portion of a tube, while reducing the heat provided to the tube and thus improving accuracy and/or precision of the position and/or oscillation frequency measurement. This allows for accurate measurements of a flow rate of the fluid over the whole range of 50 µl/ml to 5 ml/min, which may be particularly desirable in the context of liquid chromatography and high performance liquid chromatography. This in turn advantageously allows to control the flow rate provided by a pump, e.g. through an active feedback loop, which may lower the requirements for the flow precision of a pump and therefore render the pump and the overall system less complex and increase the availability of suitable pumps. In particular, embodiments of the present invention advantageously allow to separate the source 1 of electromagnetic radiation from the tube assembly 4 and to thus avoid undesired heating of the tube assembly 4 through heat produced by the source 1 as an undesired side product, which may in turn falsify the flow measurements and render the results less accurate. This is achieved by the introduction of at least one source optical element 5 which transmits the electromagnetic radiation provided by the source 1 but not (or at least not significantly) the heat of the source 1.

A further potential advantage of using an source optical element 5 according to the present invention is that it provides an increased flexibility regarding the placement and orientation of the source (cf. FIG. 1c). Furthermore, it can readily be combined with known optical Coriolis mass flow meters and the measurement methods developed for such sensors.

Whenever a relative term, such as "about", "substantially" or "approximately" is used in this specification, such a term should also be construed to also include the exact term. That is, e.g. "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g. that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment is provided for illustrative purpose only and should by no means be construed to limit the scope of the present invention, which is defined by the claims.

The invention claimed is:

1. An assembly comprising
a source of electromagnetic radiation;
a detector assembly comprising a detector for electromagnetic radiation, wherein the detector assembly comprises a detector assembly receiving end positioned to receive at least a part of the electromagnetic radiation from the source,
wherein at least part of the electromagnetic radiation received at the detector assembly receiving end is received by the detector;
a source optical element configured to transmit electromagnetic radiation received at a receiving end of the source optical element to an emitting end of the source optical element,
wherein the receiving end is configured to receive electromagnetic radiation of the source,
wherein the emitting end is configured to emit the transmitted electromagnetic radiation, and
wherein a first direction is defined by a light path between the emitting end and the detector assembly receiving end;
a tube assembly comprising a portion of a tube, wherein the tube assembly is positioned between the emitting end and the detector assembly receiving end in the first direction,
wherein the tube assembly is movable to change its position, and wherein an amount of electromagnetic radiation received by the detector depends on the position of the tube assembly,
wherein the source optical element suppresses the transmission at least for 90% of wavelengths in the range of 2.2 µm to 10 µm by at least a factor 10;
wherein the source optical element is a waveguide.

2. The assembly according to claim 1, wherein the detector assembly further comprises a detector optical element configured to transmit electromagnetic radiation received at a detector optical element receiving end to a detector optical element emitting end, wherein the detector optical element receiving end constitutes the detector assembly receiving end and is configured to receive electromagnetic radiation emitted by the emitting end of the source optical element, wherein the detector optical element emitting end is configured to emit the transmitted electromagnetic radiation, and wherein the detector is configured to receive at least part of the electromagnetic radiation emitted by the detector optical element emitting end.

3. The assembly according to claim 1, wherein the detector optical element is at least one of a waveguide, or a lens.

4. The assembly according to claim 1, wherein a minimum distance between the source and the tube assembly is at least 10 mm.

5. The assembly according to claim 1, wherein the portion of the tube is configured to withstand fluid pressures of a fluid being guided through the portion of the tube of at least 50 bar.

6. A Coriolis flow meter system, wherein the Coriolis flow meter system comprises a plurality of assemblies, wherein each assembly comprises:

a source of electromagnetic radiation;

a detector assembly comprising a detector for electromagnetic radiation, wherein the detector assembly comprises a detector assembly receiving end positioned to receive at least a part of the electromagnetic radiation from the source, wherein at least part of the electromagnetic radiation received at the detector assembly receiving end is received by the detector;

a source optical element configured to transmit electromagnetic radiation received at a receiving end of the source optical element to an emitting end of the source optical element, wherein the receiving end is configured to receive electromagnetic radiation of the source, wherein the emitting end is configured to emit the transmitted electromagnetic radiation, and wherein a first direction is defined by a light path between the emitting end and the detector assembly receiving end;

a tube assembly comprising a portion of a tube, wherein the tube assembly is positioned between the emitting end and the detector assembly receiving end in the first direction, wherein the tube assembly is movable to change its position, and wherein an amount of electromagnetic radiation received by the detector depends on the position of the tube assembly, wherein the Coriolis flow meter system comprises a tube, and wherein each portion of a tube of the respective tube assembly of the respective assembly is a portion of the tube of the Coriolis flow meter system, wherein the source optical element suppresses the transmission at least for 90% of wavelengths in the range of 2.2 μm to 10 μm by at least a factor 10;

wherein the source optical element is a waveguide.

7. The Coriolis flow meter system according to claim 6, wherein the Coriolis flow meter system comprises at least one actuator configured to induce a movement of the tube.

8. The Coriolis flow meter system according to claim 6, wherein the Coriolis flow meter system is configured to determine the volume flow rate of the fluid at least over the complete range of 1 ul/min to 10 ml/min.

9. The Coriolis flow meter system according to claim 8, wherein the Coriolis flow meter system is configured to determine the volume flow rate of the fluid over the range of 1 ul/min to 5 ml/min with an accuracy of at least 0.1%.

10. A method, wherein the method uses a Coriolis flow meter system comprising a plurality of assemblies, wherein each assembly comprises:

a source of electromagnetic radiation;

a detector assembly comprising a detector for electromagnetic radiation, wherein the detector assembly comprises a detector assembly receiving end positioned to receive at least a part of the electromagnetic radiation from the source, wherein at least part of the electromagnetic radiation received at the detector assembly receiving end is received by the detector;

a source optical element configured to transmit electromagnetic radiation received at a receiving end of the source optical element to an emitting end of the source optical element, wherein the receiving end is configured to receive electromagnetic radiation of the source, wherein the emitting end is configured to emit the transmitted electromagnetic radiation, and wherein a first direction is defined by a light path between the emitting end and the detector assembly receiving end;

a tube assembly comprising a portion of a tube, wherein the tube assembly is positioned between the emitting end and the detector assembly receiving end in the first direction, wherein the tube assembly is movable to change its position, and wherein an amount of electromagnetic radiation received by the detector depends on the position of the tube assembly, wherein the Coriolis flow meter system comprises a tube, and wherein each portion of a tube of the respective tube assembly of the respective assembly is a portion of the tube of the Coriolis flow meter system, wherein the source optical element suppresses the transmission at least for 90% of wavelengths in the range of 2.2 μm to 10 μm by at least a factor 10;

wherein the source optical element is a waveguide wherein the method comprises guiding electromagnetic radiation emitted by the source through the source optical element and in the direction of the detector assembly for each assembly comprised by the Coriolis flow meter system, respectively.

11. The method according to claim 10, wherein the method comprises detecting the amount of electromagnetic radiation reaching the respective detector of the plurality of assemblies and generating corresponding detector data, and determining a flow rate based on the detector data.

12. The method according to claim 11, wherein the step of determining the flow rate further comprises determining a respective oscillation frequency and/or phase of the tube assembly of each of the plurality of assemblies based on the detector data.

13. The method according to claim 10, wherein the method further comprises in a first flow step, causing a fluid to flow through the tube with a flow rate in the range of 50 μl/min to 500 μl/min, and in a second flow step, causing a fluid to flow through the tube with a flow rate in the range of 1 ml/min to 5 ml/min.

14. A solvent delivery system configured to provide a mixture of at least two solvents, the solvent delivery system comprising
- at least two pump units, a mixer, and
- at least two Coriolis flow meter systems,
- wherein each Coriolis flow meter system comprises a plurality of assemblies, wherein each assembly comprises:
- a source of electromagnetic radiation;
- a detector assembly comprising a detector for electromagnetic radiation,
- wherein the detector assembly comprises a detector assembly receiving end positioned to receive at least a part of the electromagnetic radiation from the source,
- wherein at least part of the electromagnetic radiation received at the detector assembly receiving end is received by the detector;
- a source optical element configured to transmit electromagnetic radiation received at a receiving end (51) of the source optical element to an emitting end of the source optical element,
- wherein the receiving end is configured to receive electromagnetic radiation of the source,
- wherein the emitting end is configured to emit the transmitted electromagnetic radiation, and
- wherein a first direction is defined by a light path between the emitting end and the detector assembly receiving end;
- a tube assembly comprising a portion of a tube, wherein the tube assembly is positioned between the emitting end and the detector assembly receiving end in the first direction,
- wherein the tube assembly is movable to change its position, and wherein an amount of electromagnetic radiation received by the detector depends on the position of the tube assembly,
- wherein the Coriolis flow meter system comprises a tube, and
- wherein each portion of a tube of the respective tube assembly of the respective assembly is a portion of the tube of the Coriolis flow meter system,
- wherein the source optical element suppresses the transmission at least for 90% of wavelengths in the range of 2.2 µm to 10 µm by at least a factor 10;
- wherein the source optical element is a waveguide.

* * * * *